US012426597B2

(12) United States Patent
Gao et al.

(10) Patent No.: US 12,426,597 B2
(45) Date of Patent: *Sep. 30, 2025

(54) HERBICIDAL COMPOSITIONS INCLUDING DRIFT RETARDANT AGENTS AND METHODS OF MAKING THE SAME

(71) Applicant: Monsanto Technology LLC, Saint Louis, MO (US)

(72) Inventors: Jingsi Gao, Creve Coeur, MO (US); Ganiyu Jimoh, St. Louis, MO (US); Alison Macinnes, Wildwood, MO (US); David A. Morgenstern, Creve Coeur, MO (US)

(73) Assignee: Monsanto Technology LLC, Saint Louis, MO (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/379,281

(22) Filed: Oct. 12, 2023

(65) Prior Publication Data

US 2024/0114899 A1 Apr. 11, 2024

Related U.S. Application Data

(63) Continuation of application No. 17/144,774, filed on Jan. 8, 2021, now Pat. No. 11,825,840.

(60) Provisional application No. 62/959,389, filed on Jan. 10, 2020.

(51) Int. Cl.
| | |
|---|---|
| *A01N 25/24* | (2006.01) |
| *A01N 37/36* | (2006.01) |
| *A01N 37/40* | (2006.01) |
| *A01N 57/20* | (2006.01) |
| *A01N 65/20* | (2009.01) |
| *C08F 283/06* | (2006.01) |
| *C08K 5/092* | (2006.01) |

(52) U.S. Cl.
CPC ............ *A01N 25/24* (2013.01); *A01N 37/36* (2013.01); *A01N 37/40* (2013.01); *A01N 57/20* (2013.01); *A01N 65/20* (2013.01); *C08F 283/06* (2013.01); *C08K 5/092* (2013.01)

(58) Field of Classification Search
None
See application file for complete search history.

(56) References Cited

U.S. PATENT DOCUMENTS

| | | | |
|---|---|---|---|
| 5,576,451 | A | 11/1996 | Trius Oliva et al. |
| 6,753,003 | B1 | 6/2004 | Kober et al. |
| 7,993,631 | B2 | 8/2011 | Takeda et al. |
| 9,743,664 | B2 | 8/2017 | Hemminghaus et al. |
| 11,793,195 | B2 * | 10/2023 | Gao ............... A01N 25/04 |
| 11,825,840 | B2 * | 11/2023 | Gao ............... A01N 37/40 |
| 12,133,526 | B1 | 11/2024 | Palmer, Jr. et al. |
| 2001/0034304 | A1 | 10/2001 | Volgas et al. |
| 2005/0112081 | A1 | 5/2005 | Loeffler et al. |
| 2008/0260663 | A1 | 10/2008 | Yamato et al. |
| 2011/0086760 | A1 | 4/2011 | Casana Giner et al. |
| 2013/0035234 | A1 | 2/2013 | Estrine et al. |
| 2013/0109572 | A1 | 5/2013 | Pernak et al. |
| 2013/0252812 | A1 | 9/2013 | Shao et al. |
| 2013/0252817 | A1 | 9/2013 | Shao et al. |
| 2014/0128264 | A1 | 5/2014 | Hemminghaus et al. |
| 2015/0133299 | A1 | 5/2015 | Shao et al. |
| 2015/0264924 | A1 | 9/2015 | Hemminghaus et al. |
| 2015/0296775 | A1 | 10/2015 | Olds et al. |
| 2016/0278370 | A1 | 9/2016 | Qin et al. |
| 2019/0327960 | A1 | 10/2019 | Hemminghaus et al. |
| 2021/0212315 | A1 * | 7/2021 | Gao ............... A01N 25/30 |
| 2021/0235694 | A1 * | 8/2021 | Hemminghaus ....... A01N 43/36 |

FOREIGN PATENT DOCUMENTS

| | | |
|---|---|---|
| CN | 101971841 A | 2/2011 |
| CN | 102532519 A | 7/2012 |
| CN | 105112169 A | 12/2015 |
| WO | WO-9608150 A1 | 3/1996 |
| WO | WO2011/019652 | 2/2011 |
| WO | WO-2014071374 A2 | 5/2014 |
| WO | WO-2015069984 A1 | 5/2015 |
| WO | WO-2018126017 A1 | 7/2018 |
| WO | WO2018/218016 | 11/2018 |
| WO | WO2018/218035 | 11/2018 |
| WO | WO2019/092199 | 5/2019 |
| WO | WO-2019092158 A1 | 5/2019 |

(Continued)

OTHER PUBLICATIONS

Knothe, G.; Cermak, S.C.; Evangelista, R.L., "Methyl Esters from Vegetable Oils with Hydroxy Fatty Acids: Comparison of Lesquerella and Castor Methyl Esters," *Fuel*, 2012, 96, 535-40.

Zhang, Bo-Xing et al., "Improvement of the rheological properties of trans-1,4-polyisoprene from *Eucommia ulmoides* Oliver by tri-branched poly(ricinoleic acid)," *Polymer Journal*, 2016, 48, 821-827.

Bauer, Martin et al., "In-Can Drift Control Technology for Auxin Herbicides," *Proceedings ISAA*, 2016, 161-167.

Shalaby et al. "Role played by the head size of some non-ionic surfactants on their adsorption into montmorillonite clay", Polym. Adv. Technol. 2004, vol. 15, pp. 533-538.

*Primary Examiner* — Alton N Pryor
(74) *Attorney, Agent, or Firm* — Harness, Dickey & Pierce, P.L.C.

(57) ABSTRACT

Herbicidal compositions for reducing off-site movement or drift of herbicides are described. The herbicidal compositions can include an auxin herbicide, an oil or an ester of the oil, and a polymeric emulsifying agent, such as glycerol ethoxylate-polyricinoleate, glycerol ethoxylate-poly-(12-hydroxystearate), polyethylene glycol (PEG)-polyricinoleate, PEG-poly-(12-hydroxystearate), and a combination thereof. Methods of making such compositions and methods of making such polymeric emulsifying agents are also described.

18 Claims, 2 Drawing Sheets

(56) References Cited

FOREIGN PATENT DOCUMENTS

| WO | WO2019/212888 | 11/2019 |
| WO | WO2019/236723 | 12/2019 |
| WO | WO-2019236723 A1 | 12/2019 |

* cited by examiner

HERBICIDAL COMPOSITIONS INCLUDING DRIFT RETARDANT AGENTS AND METHODS OF MAKING THE SAME

CROSS-REFERENCE TO RELATED APPLICATION

This application is a continuation of U.S. Nonprovisional application Ser. No. 17/144,774, filed Jan. 8, 2021, which claims the benefit of and priority to U.S. Provisional Application Ser. No. 62/959,389, filed Jan. 10, 2020. The entire disclosures of each of these references are hereby incorporated by reference.

TECHNICAL FIELD

The disclosure relates generally to herbicidal composition concentrates including at least one herbicide, such as an auxin herbicide, an oil or an ester thereof, and a polymeric emulsifying agent. The disclosure further relates generally to methods of making such herbicidal composition concentrates and methods of making the polymeric emulsifying agent.

BACKGROUND

Auxin herbicides, such as dicamba (3,6-dichloro-2-methoxybenzoic acid) and 2,4-D (2,4-dichlorophenoxyacetic acid), are commonly used to control auxin-susceptible plant growth on both agricultural and non-agricultural lands. Off-site movement of these herbicides has become a source of concern and can result in restrictions on the use of these herbicides. For example, migration of these herbicides from the application site to adjacent crop plants, such as soybeans and cotton, can occur causing contact damage to sensitive plants. Auxin herbicide off-site movement can occur by three primary mechanisms: physical movement or drift of small particles in the spray, contamination of the sprayer, and volatility of the herbicide after application. Monsanto has addressed volatility by adding potassium acetate, with the trade name Vaporgrip™ technology, to auxin herbicide formulations.

To address drift issues, drift retardant agents (DRAs) (also known as drift reduction agents or drift control agents) can be included in herbicidal compositions. DRAs for herbicidal sprays can work by modifying the size distribution of particles formed by the nozzle, for example, by partially suppressing the formation of the smallest particles, also known as driftable fines, which settle slowest and are most prone to drift with the wind. Definitions of the size limit of "driftable fines" vary, but particles with a diameter below 150 μm are typically considered susceptible to drift. There are typically two types of DRAs. The first type of DRA is polymers, which can increase the extensional viscosity of the spray mixture. These polymers, limited in commercial practice to polyacrylamides, polyethylene oxide, and guar gum, can shift the spray particle size distribution to larger diameters. While such polymers can be effective in reducing driftable fines for some nozzles, for example, the Turbo Teejet® Induction (TTI™) nozzle from TeeJet and the HYPRO® Ultra Lo-Drift (ULD) nozzle, they can be less preferred because they can result in significantly coarser spray, which can provide poorer coverage, compromising weed control. Furthermore, such polymers, if incorporated into an herbicidal formulation, can generally result in unacceptably high viscosity.

The second type of DRA is known as "oil-type" or "emulsion-type" DRAs. As the name suggests, an oil-type DRA, largely immiscible with water, can be included in a tank formulation as an emulsion or micro-emulsion. Drift retardants of this type are available commercially as additives to a spray tank under brand names, such as Border EG (Precision Labs) and InterLock® (Winfield). These oil-type or emulsion-type DRAs can be effective at the suppression of driftable fines, work well in a wide variety of nozzles, and can have less effect on the average particle size of the spray; thus, providing better application coverage and herbicidal efficacy. While the use of oil-type or emulsion-type DRAs as a tank additive is common and straightforward, incorporation into an auxin herbicidal formulation remains technically challenging, particularly for producing auxin herbicidal formulations with a high load of auxin herbicide. For example, auxin herbicides, such as dicamba and 2,4-D, are typically formulated as salts in concentrated aqueous solution. Current commercial examples are Dow's Enlist Duo® and Enlist One™ products, which incorporate a proprietary emulsion-type DRA into an aqueous solution of the choline salt of 2,4-D. Enlist Duo® also includes the dimethylamine salt of glyphosate. There is also a published report from Clariant of a proprietary DRA that can be incorporated into the diglycolamine (DGA) salt of dicamba.

However, it is well known that stabilizing an emulsion in concentrated salt solution is very difficult because emulsifiers perform poorly at high ionic strength. Emulsions can be stabilized by two mechanisms, ionic repulsion and steric stabilization. At high ionic strength, electrostatic repulsion between oil droplets can be screened thereby preventing ionic stabilization. Typical nonionic surfactants, which can stabilize an emulsion by steric repulsion, rely on polyethylene glycol (PEG) chains, but PEG chains can have poor solubility and less extended structures in media with high electrolyte content.

These considerations along with the need to achieve high auxin loading favor formulations with minimal oil-type DRAs. Thus, another challenge in utilizing oil-type DRAs is maintaining efficacy against drift with a limited amount of an oil-type DRA, particularly compared to oil added to the spray tank when using commercial spray adjuvants. Accordingly, auxin herbicide compositions having a DRA incorporated therein for reducing drift of the herbicide are desirable, particularly reduced-drift compositions that exhibit no significant reduction in herbicidal effectiveness relative to currently available compositions.

BRIEF SUMMARY

New and useful herbicidal compositions including a drift retardant agent (DRA) and polymeric emulsifying agent and methods of making the same are set forth in the appended claims. Illustrative embodiments are also provided to enable a person skilled in the art to make and use the claimed subject matter.

In one aspect, an herbicidal composition concentrate is described. The herbicidal composition concentrate includes at least one herbicide, an oil or an ester of the oil, and a polymeric emulsifying agent. The at least one herbicide can be present in an amount (acid equivalent weight) of greater than or equal to about 5% by weight of the composition concentrate, and the at least one herbicide can include an auxin herbicide. The polymeric emulsifying agent can be selected from the group consisting of glycerol ethoxylate-polyricinoleate, glycerol ethoxylate-poly-(12-hydroxystearate), polyethylene glycol (PEG)-polyricinoleate, PEG-poly- (12-hydroxystearate), and a combination thereof. In some embodiments, the herbicidal composition concentrate further includes a surfactant selected from the group consisting of a phosphate ester, an alkylpolysaccharide, an alkoxylated castor oil, and a combination thereof. In some embodiments, the herbicidal composition concentrate further includes at least one monocarboxylic acid or a monocarboxylate thereof.

In another aspect, a method of making an herbicidal composition concentrate is described. The method includes admixing at least one herbicide with an oil or an ester of the oil and a polymeric emulsifying agent to form the herbicidal composition concentrate. The at least one herbicide can be admixed in an amount (acid equivalent weight) of greater than or equal to about 5% by weight of the composition concentrate, and the at least one herbicide can include an auxin herbicide. The polymeric emulsifying agent can be selected from the group consisting of glycerol ethoxylate-polyricinoleate, glycerol ethoxylate-poly-(12-hydroxystearate), polyethylene glycol (PEG)-polyricinoleate, PEG-poly-(12-hydroxystearate), and a combination thereof. Ins some embodiments, the oil or the ester of the oil can be admixed with the polymeric emulsifying agent to form a first mixture and the at least one herbicide can be admixed with the first mixture to form the herbicidal composition concentrate. In some embodiments, the method further includes admixing at least one surfactant with the at least one herbicide, the oil or the ester of the oil, and the polymeric emulsifying agent. The surfactant can be selected from the group consisting of a phosphate ester, an alkylpolysaccharide, an alkoxylated castor oil, and a combination thereof. In some embodiments, the method further includes admixing at least one monocarboxylic acid or a monocarboxylate thereof with the at least one herbicide, the oil or the ester of the oil, and the polymeric emulsifying agent.

In another aspect, a method of making a polymeric surfactant selected from the group consisting of glycerol ethoxylate-polyricinoleate, glycerol ethoxylate-poly-(12-hydroxystearate), polyethylene glycol (PEG)-polyricinoleate, and PEG-poly-(12-hydroxystearate) is described. The method includes contacting PEG or ethoxylated glycerol in a liquid or molten state with a $C_1$-$C_4$ alkyl ricinoleate or a $C_1$-$C_4$ alkyl 12-hydroxystearate in the presence of a basic catalyst to form a reaction mixture at a reaction temperature sufficient to maintain the reaction mixture in a liquid state.

Further benefits of the present invention will be apparent to one skilled in the art from reading this patent application. The embodiments of the invention described in the following paragraphs are intended to illustrate the invention and should not be deemed to narrow the scope of the invention.

DETAILED DESCRIPTION OF EXAMPLE EMBODIMENTS

Figure 1A:
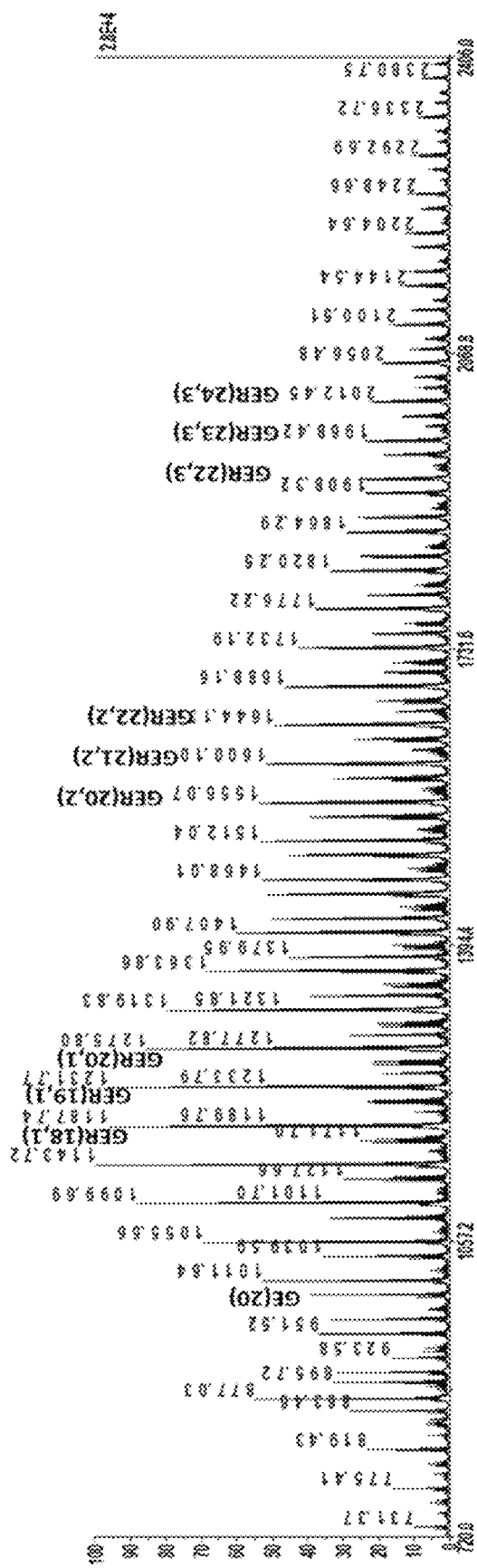
FIGS. 1A and 1B illustrate a mass spectrum of glycerol ethoxylate-4-ricinoleate characterized by mass spectrometry with matrix-assisted laser desorption ionization (MALDI-MS).

The following description of example embodiments provides information that enables a person skilled in the art to make and use the subject matter set forth in the appended claims, but it may omit certain details already well known in the art. The following detailed description is, therefore, to be taken as illustrative and not limiting.

The present disclosure provides herbicidal composition concentrates, for example, including an auxin herbicide, wherein the compositions exhibit reduced drift. Specifically, the compositions include, in addition to the auxin herbicide, an oil or an ester of the oil, and a polymeric emulsifying agent. The polymeric emulsifying agent can be selected from the group consisting of a phosphate ester, an alkylpolysaccharide, an alkoxylated castor oil, and a combination thereof. The compositions can also include a surfactant and/or at least one monocarboxylic acid or a monocarboxylate thereof for reducing volatility of the herbicide upon application.

Typically, auxin herbicides, such as dicamba and 2,4-D, are formulated as salts in concentrated aqueous solution. It is well known that stabilizing an emulsion in a concentrated salt solution is very difficult because emulsifiers perform poorly at high ionic strength. Additionally, inclusion of a monocarboxylic acid or a monocarboxylate thereof for reducing volatility further increases the ionic strength of the composition subsequently increasing the difficulty in stabilizing an emulsion of an oil type DRA and the difficulty in preventing undesirable creaming.

However, it has surprisingly been discovered that emulsions and micro-emulsions of oils can be stabilized in solutions with auxin herbicides, particularly high loads of auxin herbicides in salt form (e.g., monoethanolamine (MEA) salt of dicamba), with polymeric emulsifying agents including two or more polyethylene glycol (PEG) chains terminated with oligomers of fatty acids. Additionally, the polymeric emulsifying agents described herein can be incorporated into herbicidal compositions including auxin herbicides at levels that improve spray particle size distributions. The compositions provided herein can advantageously protect against drift of auxins, such as dicamba and 2,4-D, when applied with many common nozzles per label directions. Additionally, the compositions can provide assurance of compliance when a DRA is required, thus enhancing product stewardship. Incorporation of the DRA into the herbicidal composition concentrate also provides convenience and cost savings for growers and applicators compared to purchasing and adding an herbicide and a DRA separately. In various aspects, the compositions described herein provide substantial suppression of fines with nozzles, such as, but not limited to Greenleaf TurboDrop® XL (TDXL), Lechler ID, Wilger DR, Teejet® AIXR, Hypro® ULD and Teejet® TTI without significantly increasing the mean particle size of the spray. The compositions described herein with a built-in DRA enable improved spray quality with better coverage and weed control.

A. Auxin Herbicide Component

The term "auxin herbicide" refers to an herbicide that functions as a mimic of an auxin plant growth hormone, thereby affecting plant growth regulation. Examples of auxin herbicides that are suitable for use in the herbicidal compositions of the present invention include, without limitation, benzoic acid herbicides, phenoxy herbicides, pyridine carboxylic acid herbicides, pyridine oxy herbicides, pyrimidine carboxy herbicides, quinoline carboxylic acid herbicides, and benzothiazole herbicides.

Examples of auxin herbicides include, but are not limited to: 3,6-dichloro-2-methoxybenzoic acid (dicamba); 2,4-dichlorophenoxyacetic acid (2,4-D); 4-(2,4-dichlorophenoxy) butyric acid (2,4-DB); dichloroprop; 2-methyl-4-chlorophenoxyacetic acid (MCPA); 4-(4-chloro-2-methylphenoxy) butanoic acid (MCPB); 4-chlorophenoxyacetic acid; 2,4,5- trichlorophenoxyacetic acid (2,4,5-T); aminopyralid; clopyralid; fluroxypyr; triclopyr; mecoprop; picloram; quinclorac; aminocyclopyrachlor; benazolin; halauxifen; fluorpyrauxifen; methyl 4-amino-3-chloro-5-fluoro-6-(7-fluoro-1H-indol-6-yl)pyridine-2-carboxylic acid; 4-amino-3-chloro-5-fluoro-6-(7-fluoro-1H-indol-6-yl)pyridine-2-carboxylicacid; benzyl 4-amino-3-chloro-5-fluoro-6-(7-fluoro-1H-indol-6-yl)pyridine-2-carboxylicacid; methyl 4-amino-3-chloro-5-fluoro-6-(7-fluoro-1-isobutyryl-1H-indol-6-yl)pyridine-2-carboxylic acid; methyl 4-amino-3-chloro-6-[1(2,2-dimethylpropanoyl)-7-fluoro-1H-indol-6-yl]-5-fluoropyridine-2-carboxylicacid; methyl 4-amino-3-chloro-5-fluoro-6-[7-fluoro-1-(methoxyacetyl)-1H-indol-6-yl]pyridine-2-carboxylic acid; methyl 6-(1-acetyl-7-fluoro-1H-indol-6-yl)-4-amino-3-chloro-5-fluoropyridine-2-carboxylic acid; butyl 4-amino-3-chloro-5-fluoro-6-(7-fluoro-1H-indol-6-yl)pyridine-2-carboxylic acids, including salts and esters thereof racemic mixtures and resolved isomers thereof and combinations thereof.

In any embodiment, the herbicidal composition concentrate can include dicamba, or an agriculturally acceptable salt or ester thereof. Examples of suitable dicamba salts include, but are not limited to N,N-bis-[aminopropyl]methylamine, monoethanolamine (MEA), dimethylamine (e.g., BANVEL®, ORACLE®, etc.), isopropylamine, triethanolamine, diglycolamine (e.g., CLARITY®, VANQUISH®, etc.), potassium, and sodium salts, and combinations thereof. Commercially available sources of dicamba, and its agriculturally acceptable salts, include those products sold under the trade names BANVEL®, CLARITY®, DIABLO®, DISTINCT, ORACLE®, VANQUISH®, and VISION®.

In any embodiment, the herbicidal composition concentrate can include an agriculturally acceptable dicamba salt, wherein the salt is selected from the group consisting of N,N-[aminopropyl]methylamine, monoethanolamine, dimethylamine, isopropylamine, diglycolamine, a potassium salt, and a sodium salt, and combinations thereof.

Throughout the remainder of the description of the invention, where reference is made to dicamba, or an agriculturally acceptable salt or ester thereof, one skilled in the art will understand that the principles of the present invention apply to auxin herbicides generally, including those described above, and that the present invention is not limited to herbicidal compositions containing dicamba, or an agriculturally acceptable salt or ester thereof.

Additionally or alternatively, the herbicidal composition concentrate can include 2,4-D, or an agriculturally acceptable salt or ester thereof. Examples of suitable 2,4-D salts include, but are not limited to the choline, dimethylamine, triethanolamine, and isopropylamine salts, and combinations thereof. Examples of suitable 2,4-D esters include, but are not limited to methyl, ethyl, propyl, butyl (2,4-DB), and isooctyl esters, and combinations thereof. Commercially available sources of 2,4-D, and its agriculturally acceptable salts and esters, include those products sold under the trade names BARRAGE®, FORMULA 40®, OPT-AMINE®, and WEEDAR 64®.

Additionally or alternatively, the herbicidal composition concentrate can include an agriculturally acceptable 2,4-D salt, wherein the salt is selected from the group consisting of choline, dimethylamine, triethanolamine, and isopropylamine salts, and combinations thereof.

Additionally or alternatively, the herbicidal composition concentrate can include an agriculturally acceptable 2,4-D ester, wherein the ester is selected from the group consisting of butyl (i.e., 2,4-DB) and isooctyl esters, and combinations thereof.

Additionally or alternatively, the herbicidal composition concentrate can include at least two auxin herbicides, for example, dicamba, or an agriculturally acceptable salt or ester thereof, and 2,4-D, or an agriculturally acceptable salt or ester thereof.

Additionally or alternatively, the herbicidal composition concentrate can include an agriculturally acceptable auxin herbicide salt (such as a dicamba salt, a 2,4-D salt, and/or a 2,4-DB salt) that is an ionic liquid as described in published application US 2013/0109572, i.e., a salt that is a liquid at a temperature at or below about 150° C. The entire text of US 2013/0109572 is incorporated by reference into this application.

B. Oil Component

In various aspects, an oil or an ester thereof is included in the herbicidal composition concentrate. The oil or an ester thereof may serve as a DRA.

Examples of a suitable oil include, but are not limited to a vegetable oil, an ester of a vegetable oil, a petroleum-based oil, and a combination thereof. Suitable vegetable oils include, but are not limited to soybean oil, an ester of soybean oil, canola oil, an ester of canola oil, palm oil, an ester of palm oil, rapeseed oil, an ester of rapeseed oil, sunflower seed oil, an ester of sunflower seed oil, corn oil, an ester of corn oil, peanut oil, an ester of peanut oil, sesame oil, an ester of sesame oil, olive oil, an ester of olive oil, and combinations thereof. A suitable ester of a vegetable oil include, but are not limited to a methyl ester, for example, canola methyl ester, soybean methyl ester, and so on, and an ethyl ester, for example, canola ethyl ester, soybean ethyl ester, and so on Suitable petroleum-based oils include, but are not limited to alkanes (e.g., $C_6$-$C_9$ alkane, n-alkanes, cyclo-alkanes, iso-alkanes, etc.), distillates, naphtha (e.g., heavy naphtha, paraffinic naphtha, petroleum naphtha, solvent naphtha, etc.), mineral oil, aliphatic oil, aromatic oil, crude oil, olefins, olefin mixtures, and combinations thereof. In any embodiment, the petroleum-based oil can have a suitable flash point, typically greater than 150° F., for example, ISOPAR M™ (available from ExxonMobil).

C. Polymeric Emulsifying Agent Component

1. Polymeric Emulsifying Agent Structure

It has been surprisingly found that polymeric emulsifying agents including two or more polyethylene glycol (PEG) chains terminated with oligomers of fatty acids can stabilize emulsions and micro-emulsions of oils and esters thereof as described herein in solutions with auxin herbicides, particularly high loads of auxin herbicides in salt form (e.g., monoethanolamine (MEA) salt of dicamba). Additionally, the polymeric emulsifying agents described herein can be incorporated into herbicidal compositions including auxin herbicides at levels which advantageously improve spray particle size distributions.

In any embodiment, the polymeric emulsifying agent can include two or more oligomers of ricinoleic acid or 12-hydroxystearic acid, which can be obtained commercially from castor oil and hydrogenated castor oil, respectively. Without being bound by theory, it is believed that the polymeric emulsifying agents described herein can be more resistant to collapse of the PEG chains in high-ionic strength media than conventional surfactants because the presence of two or more hydrophobes (e.g., the ricinoleate block or 12-hydroxystearate block) embedded in the oil droplet can stretch the ethylene oxide (EO) chains of the polymeric emulsifying agent. The fatty acid units can be linked to each other by esterification between the $C_{12}$-hydroxyl and the $C_1$-carboxylate. The structures of these oligomers are shown below:

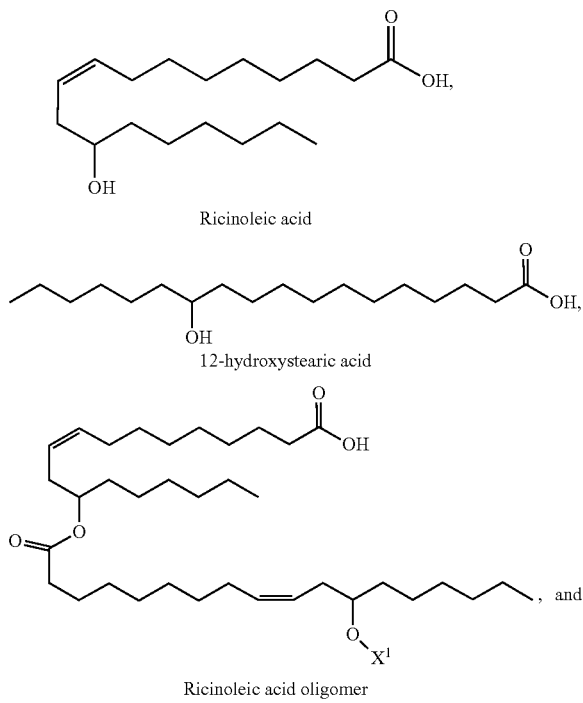

Ricinoleic acid 12-hydroxystearic acid

Ricinoleic acid oligomer

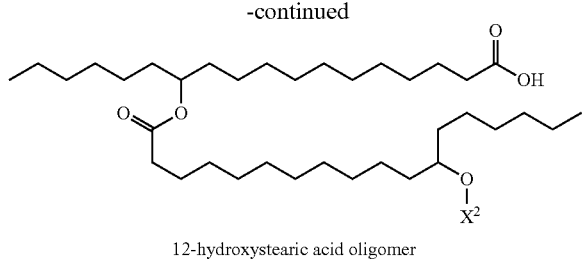

12-hydroxystearic acid oligomer wherein $X^1$ can be H or ricinoleate and $X^2$ can be H or 12-hydroxystearate.

The oligomers can be esterified to a PEG chain or an ethoxylated glycerol, which can provide hydrophilic properties to balance the hydrophobic contribution of the fatty acid oligomers. In any embodiment, the polymeric emulsifying agent can include a PEG chain of at least 500 molecular weight esterified on both ends or the hydrophile can compose multiple PEG chains. Terminal hydroxyl groups that are not esterified can be bound to an organic linker, such as glycerol or polyglycerol. Glycerol with 26 ethylene oxide units, known as "glycereth-26" is commercially available, for example, from Lonza as Ethosperse® G-26. Cocoate esters of glycerol ethoxylate with various degrees of ethoxylation are also commercially available, such as glycerol PEG-7 cocoate, CAS reg. no. 68553-03-7, available from Spectrum Chemical or Kao Chemical. In particular, the polymeric emulsifying agent can include an esterified ethoxylated glycerol, for example, glycerol ethoxylate esterified to poly-12-hydroxystearic acid, CAS reg. no. 1939051-18-9.

In any embodiment, the polymeric emulsifying agent can be selected from the group consisting of glycerol ethoxylate-polyricinoleate, glycerol ethoxylate-poly-(12-hydroxystearate), polyethylene glycol (PEG)-polyricinoleate, PEG-poly-(12-hydroxystearate), and a combination thereof. The glycerol ethoxylate-polyricinoleate can correspond in structure to Formula A:

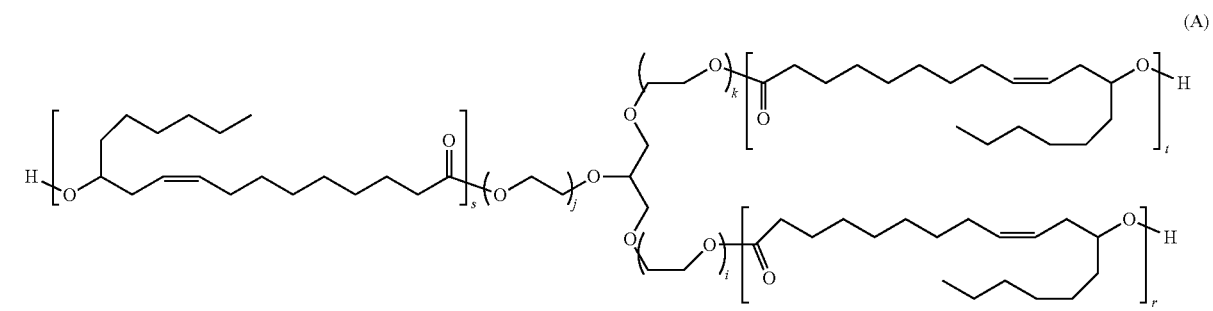

(A)

wherein i+j+k=10 to 50 or 20 to 35 and r+s+t=3 to 12 or 4 to 8. In any embodiment, each of i, j, and k independently can be an integer from zero to 50, an integer from zero to 35, an integer from zero to 20, an integer from zero to 10, an integer from 1 to 50, an integer from 1 to 35, an integer from 1 to 20, an integer from 1 to 10, an integer from 5 to 50, an integer from 5 to 35, an integer from 5 to 20, or an integer from 5 to 10. For example, i can be 1, j can be 5, and k can be 4; or i can be zero, j can be 10, and k can be 12, and so on. In any embodiment, each of r, s, and t independently can be an integer from zero to 12, an integer from zero to 8, an integer from zero to 4, an integer from zero to 3, an integer from 1 to 12, an integer from 1 to 8, an integer from 1 to 4, an integer from 1 to 3, an integer from 2 to 12, an integer from 2 to 8, an integer from 2 to 4, or an integer from 2 to 3. For example, r can be 1, s can be 1, and t can be 1; or r can be zero, s can be 3, and t can be 5, and so on.

The glycerol ethoxylate-poly-(12-hydroxystearate) can corresponds in structure to Formula B:

(B)

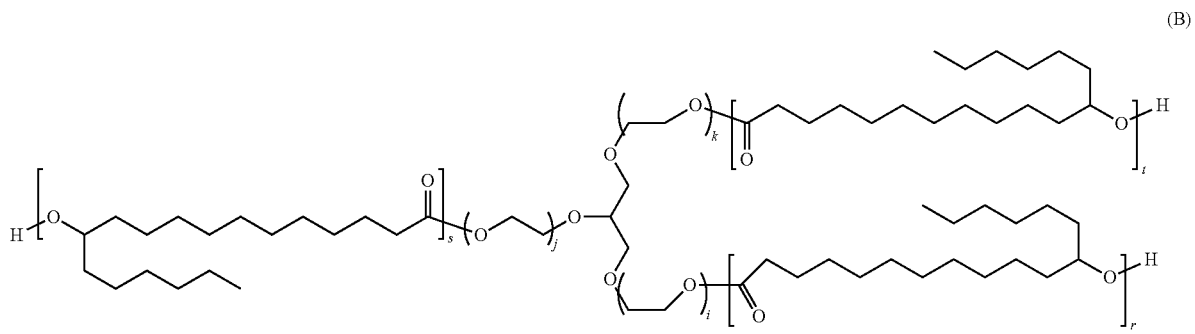

wherein i+j+k=10 to 50 or 20 to 35 and r+s+t=3 to 12 or 4 to 8. In any embodiment, each of i, j, and k independently can be an integer from zero to 50, an integer from zero to 35, an integer from zero to 20, an integer from zero to 10, an integer from 1 to 50, an integer from 1 to 35, an integer from 1 to 20, an integer from 1 to 10, an integer from 5 to 50, an integer from 5 to 35, an integer from 5 to 20, or an integer from 5 to 10. For example, i can be 1, j can be 5, and k can be 4; or i can be zero, j can be 10, and k can be 12, and so on. In any embodiment, each of r, s, and t independently can be an integer from zero to 12, an integer from zero to 8, an integer from zero to 4, an integer from zero to 3, an integer from 1 to 12, an integer from 1 to 8, an integer from 1 to 4, an integer from 1 to 3, an integer from 2 to 12, an integer from 2 to 8, an integer from 2 to 4, or an integer from 2 to 3. For example, r can be 1, s can be 1, and t can be 1; or r can be zero, s can be 3, and t can be 5, and so on.

The polyethylene glycol (PEG)-polyricinoleate can correspond in structure to Formula C:

(C)

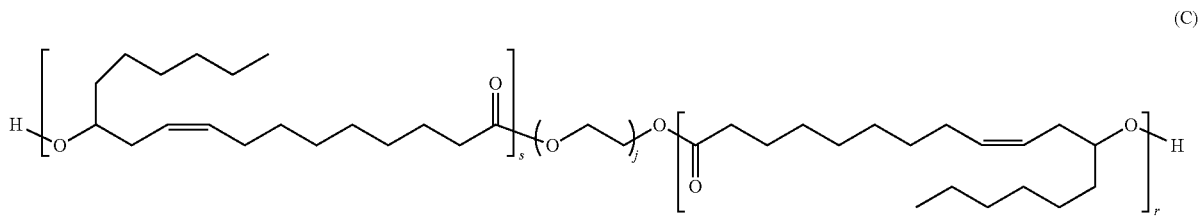

wherein j=50 to 250 or 130 to 200 and s+r=2 to 10 or 3 to 6. In any embodiment, each of s and r independently can be an integer from zero to 10, an integer from zero to 6, an integer from zero to 3, an integer from zero to 2, an integer from 1 to 10, an integer from 1 to 6, an integer from 1 to 3, or an integer from 1 to 2. For example, s can be 1 and r can be 3; or s can be zero and r can be 7, and so on.

The PEG-poly-(12-hydroxystearate) can correspond in structure to Formula D:

(D)

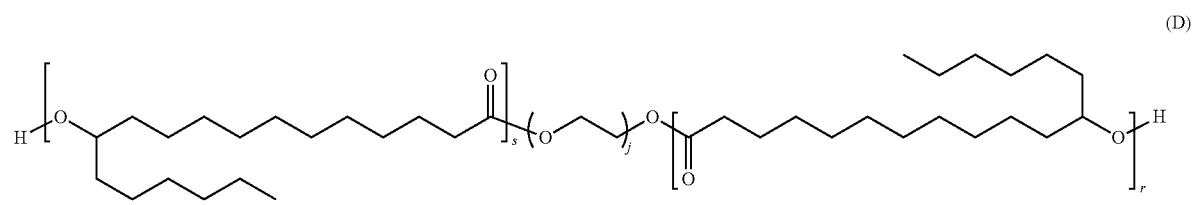

wherein j=50 to 250 or 130 to 200 and s+r=2 to 10 or 3 to 6. In any embodiment, each of s and r independently can be an integer from zero to 10, an integer from zero to 6, an integer from zero to 3, an integer from zero to 2, an integer from 1 to 10, an integer from 1 to 6, an integer from 1 to 3, or an integer from 1 to 2. For example, s can be 1 and r can be 3; or s can be zero and r can be 7, and so on.

Exemplary polymeric emulsifying agents are shown below. Polymer (1) corresponds to PEG end-functionalized with ricinoleate oligomers and Polymer (2) corresponds to glycerol ethoxylate end-functionalized with 12-hydroxystearate oligomers:

with glycerol and other polyols are known in the art and are prepared by first forming the oligomer, generally using acid catalysis and a solvent, followed by acid-catalyzed esterification. The oligomerization typically requires high temperatures and/or extended times to drive off water. For example, Takeda et. al. oligomerize 12-hydroxystearic acid in toluene catalyzed by p-toluenesulfonic acid for six hours at about 200° C. with nitrogen flow. (K. Takeda, Y. Kokeguchi, H. Sone, K. Kawai, "Oil Base and External Preparation Containing Same," 2008, U.S. Pat. No. 7,993,631, see Example 1.) Similarly, Yamato et. al. first oligomerize 12-hydroxystearic acid in xylol at 200° C. for 15 hours with nitrogen

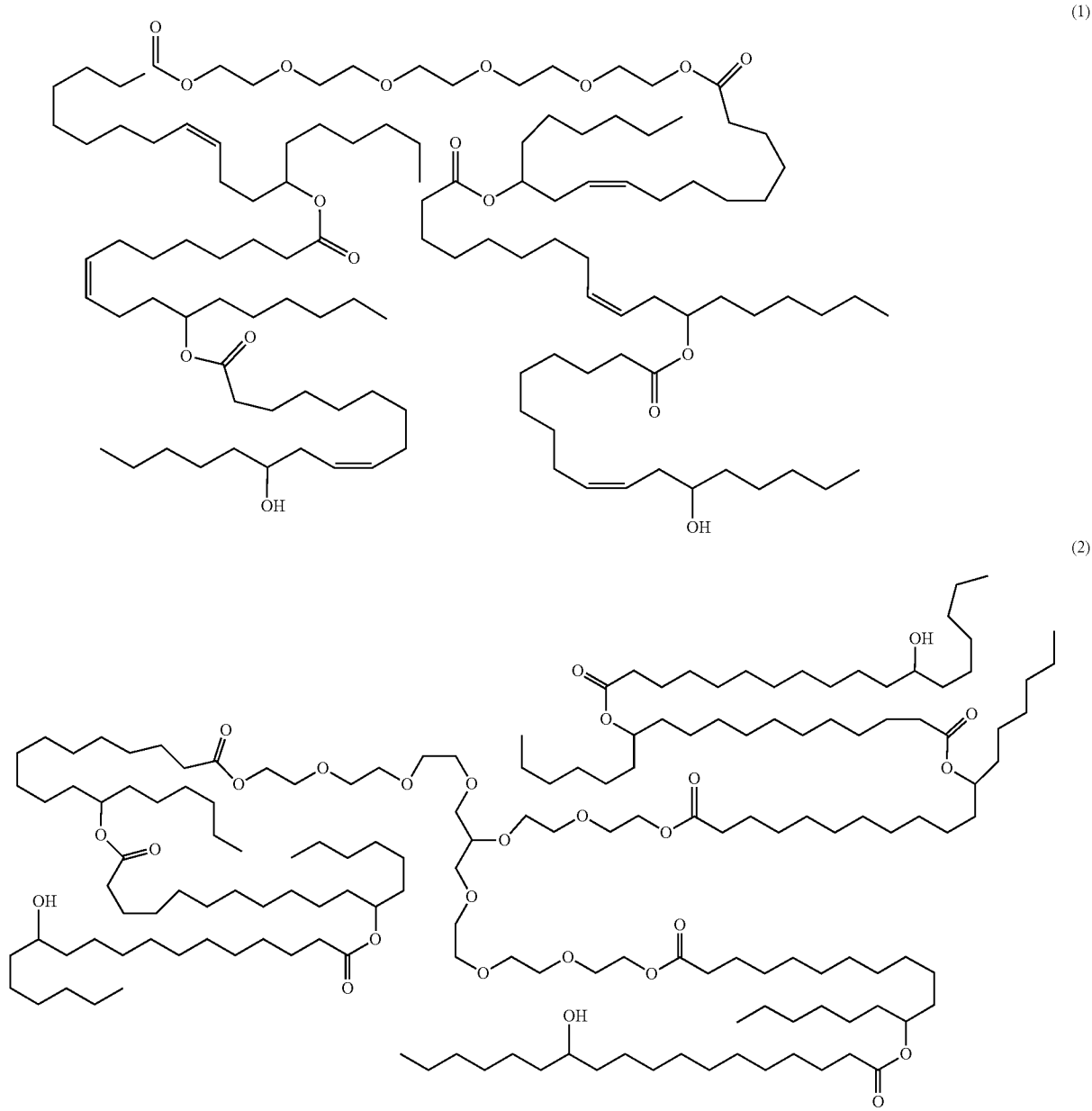

(1)

(2)

2. Methods of Making the Polymeric Emulsifying Agent

In various aspects, methods of making a polymeric emulsifying agent as described herein are also provided. Oligomers of ricinoleic acid or 12-hydroxystearic acid esterified flow. The oligomer is then esterified with di-pentaerythritol at 210° C. (Y. Yamato, Y. Oi, M. Fujisawa, "Esterification Reaction Products and Cosmetic Products," U.S. 2008/0260663, see Production Example 1).

Similar polymerization reactions can also be conducted enzymatically, but the process can be slow, and a water absorbent is required. For example, Zhang et. al. polymerized ricinoleic acid over Lipase PS over 7 days at 60° C. in the presence of molecular sieves. (Zhang, B.-X; Azuma, J.-I.; Takeno, S.; Suzuki, N.; Nakazawa, Y.; Uyama, H., "Improvement of the Rheological Properties of trans-1,4-polyisoprene from Eucommia ulmoides Oliver by Tri-branched Poly(ricinoleic acid)," Polymer Journal, 2016, 48, 821-7.) Esterification of ethoxylated glycerol with fatty acids also requires a prolonged reaction time under acidic conditions. For example, the esterification reaction between glycerol with 110-150 ethylene oxide (EO) units and tallow fatty acid required 16 hours at 160° C. (A. T. Oliva, O. P. Obiols, J. B. Llosas, E. P. Queralt, "Esters of Fatty Acids with Ethoxylated Polyols," 1996, U.S. Pat. No. 5,576,451, to Henkel, Production Examples 1-3.)

Advantageously, the methods of making a polymeric emulsifying agent as described herein can be accomplished by performing all of the esterifications in a single reactive step using esters of the fatty acids rather than free fatty acids as the starting materials. In any embodiment, a $C_1$-$C_4$ alkyl ester can be a starting material. Suitable $C_1$-$C_4$ alkyl esters include, but are not limited to methyl esters, such as methyl ricinoleate and methyl 12-hydroxystearate, and ethyl esters. Methanol, an exemplary byproduct or coproduct of the esterification reactions described herein from use of a sodium methoxide catalyst, is more volatile than water; thus, more easily driven off, which advantageously allows for the method described herein to be conducted at lower temperature and with shorter reaction times. Conversion of castor oil to its methyl ester, primarily methyl ricinoleate, is known in the art. (Knothe, G.; Cermak, S. C.; Evangelista, R. L., "Methyl Esters from Vegetable Oils with Hydroxy Fatty Acids: Comparison of *Lesquerella* and Castor Methyl Esters," Fuel, 2012, 96, 535-40.) Both methyl ricinoleate and methyl 12-hydroxystearate (derived from hydrogenated castor oil) are commercially available.

Preparation of the polymeric emulsifying agent described herein can include contacting PEG or ethoxylated glycerol with a suitable $C_1$-$C_4$ alkyl ester, for example, methyl ricinoleate or methyl 12-hydroxystearate, in the presence of a basic catalyst at a suitable temperature and for a suitable time period in a suitable reaction vessel to form a reaction mixture. A suitable temperature includes a temperature sufficient for maintaining the reaction mixture in a liquid state. Examples of a suitable temperature include a temperature of greater than or equal to about 70° C., greater than or equal to about 90° C., greater than or equal to about 110° C., greater than or equal to about 130° C., greater than or equal to about 150° C., greater than or equal to about 170° C., or about 180° C.; or from about 70° C. to about 180° C., about 90° C. to about 170° C. or about 110° C. to about 150° C. Examples of a suitable time period include greater than or equal to about 60 minutes (1 hour), greater than or equal to about 120 minutes (2 hours), greater than or equal to about 180 minutes (3 hours), or about 240 minutes (4 hours); or from about 60 minutes to about 240 minutes, about 120 minutes to about 240 minutes, or about 120 minutes to about 180 minutes. Examples of a suitable basic catalyst include, but are not limited to metal oxide catalysts, for example, a metal alkoxide or a metal hydroxide. The metal alkoxide can be a metal $C_1$-$C_4$ alkoxide, such as, but not limited to sodium methoxide and sodium ethoxide. The metal hydroxide can include, but is not limited to sodium hydroxide, and potassium hydroxide. In a particular, the basic catalyst can be sodium methoxide. In any embodiment, the basic catalyst can be present in a concentration based on the total mass of the reaction mixture of greater than or equal to about 0.1%, greater than or equal to about 0.5%, greater than or equal to about 1%, greater than or equal to about 1.5%, greater than or equal to about 2%, greater than or equal to about 2.5%, or about 3%; or from about 0.1% to about 3%, about 1% to about 3% or about 2% to about 3%. As understood by a person of ordinary skill in the art the aforementioned time and temperature parameters can vary based on how the preparation is performed, for example, length of agitation, etc. For example, the reaction mixture may be stirred or agitated under suitable conditions to cause volatilization of the alcohol coproduct of the basic catalyst (e.g., $C_1$-$C_4$ alcohol coproduct such as methanol). Such suitable conditions include but are not limited to maintaining a temperature above the boiling point of the alcohol, sweeping the headspace of the reactor with inert gas, applying a vacuum, or a combination thereof.

A slow nitrogen stream can be used to help remove the alcohol coproduct (e.g., methanol) from the reaction mixture. In any embodiment, the reaction mixture can be a homogeneous liquid, for example, PEG and/or ethoxylated glycerol each can be in a liquid state or a molten state. In some embodiments, the $C_1$-$C_4$ alkyl ester, for example, methyl ricinoleate or methyl 12-hydroxystearate, can be added dropwise to PEG or ethoxylated glycerol with stirring and the reaction can continue for at least 20 minutes after the end of the addition. In any embodiment, no solvent is required. The basic catalyst can be neutralized with a small amount of acid, for example, acetic acid, at the end of the reaction, and the whole reaction mass used in the formulations with no further purification.

An exemplary reaction scheme below shows the reaction of PEG with methyl ricinoleate. Reactions involving ethoxylated glycerol or methyl 12-hydrostearate follow the same reaction pathway.

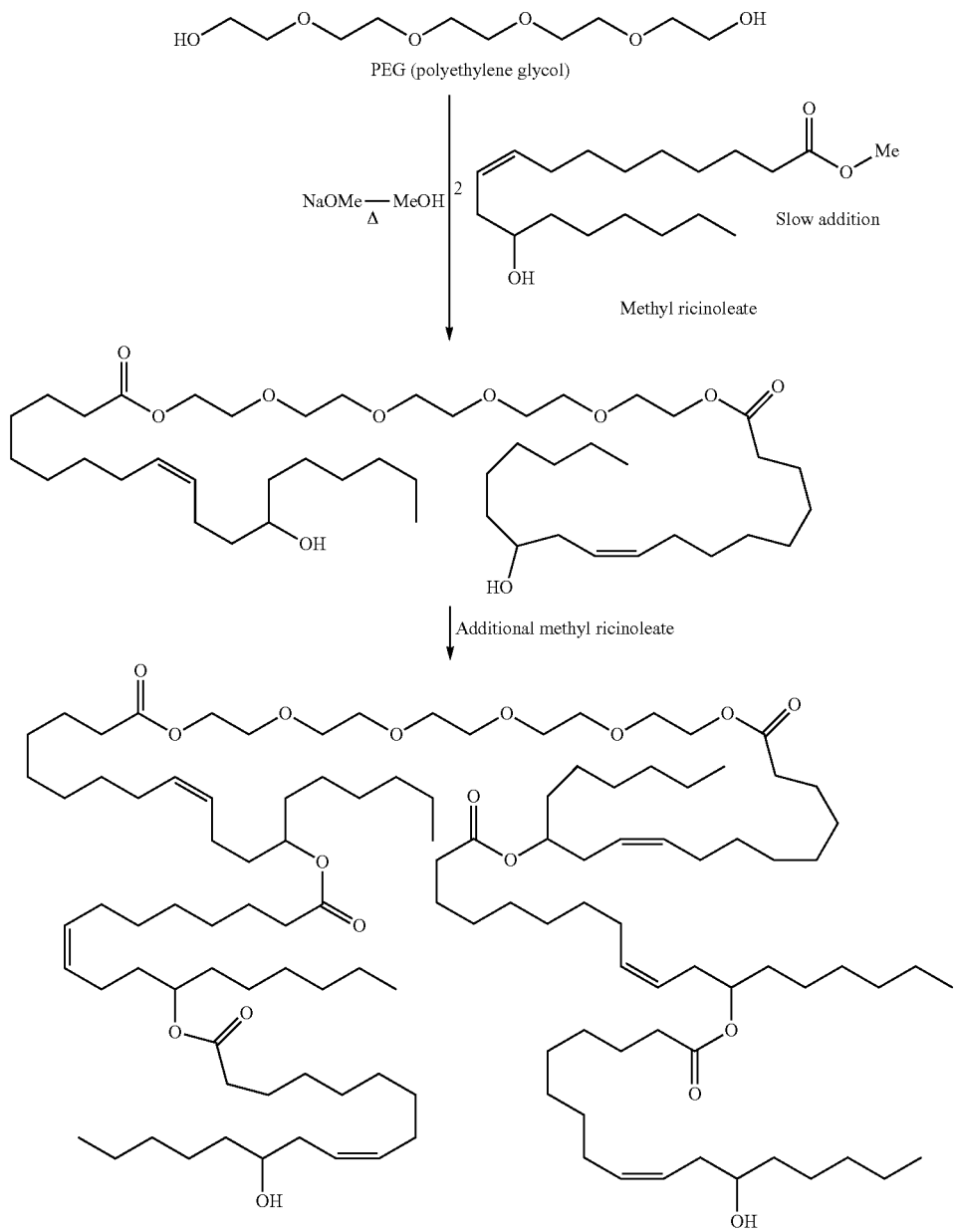

D. Surfactant

The herbicidal composition concentrates described herein can further include one or more surfactants. Examples of suitable surfactants include a phosphate ester, an alkylpolysaccharide, an alkoxylated castor oil, and combinations thereof. Such surfactants are particularly suitable due to their tolerance of high levels of salt. Furthermore, the surfactants described herein are capable of not excessively increasing the amount of fine droplets in an agriculture spray when used at the levels required to stabilize an oil emulsion in herbicide formulations comprising an auxin herbicide.

In any embodiment, the surfactant may be a phosphate ester. Examples of suitable phosphate esters include, but are not limited to alkoxylated phosphate esters of fatty acids. The alkoxylation may include alkoxy chain of any length. For example, polyethylene oxide or polypropylene oxide. Examples of said esters include polyethylene glycol octyl phosphate, polyethylene glycol isotridecyl phosphate, polyethylene glycol cetearyl phosphate, polyethylene glycol decyl phosphate, polyethylene glycol oleyl phosphate, polyethylene glycol polypropylene glycol cetyl phosphate, polyethylene glycol tridecyl phosphate, and polyethylene glycol isotridecyl phosphate. Additionally or alternatively, the phosphate ester may be ethoxylated alkyl phosphate ester, for example, having less than 10 EO units. Commercially available ethoxlyated alkyl phosphate esters include Crodafos™ O3A and Crodafos™ O5A, both available from Croda, Inc.

Additionally or alternatively, the surfactant may be an alkylpolysaccharide. Examples of suitable alkylpolysaccharide include, but are not limited to compounds of Formula (1):

$$R^{11}-O-(sug)_u \quad \text{Formula (1)}$$

wherein $R^{11}$ is a straight or branched chain substituted or unsubstituted hydrocarbyl selected from alkyl, alkenyl, alkylphenyl, alkenylphenyl having from about 4 to about 22 carbon atoms for from about 4 to 18 carbon atoms. The sug moiety is a saccharide residue, and may be an open or cyclic (i.e., pyranose) structure. The saccharide may be a monosaccharide having 5 or 6 carbon atoms, a disaccharide, an oligosaccharide or a polysaccharide. Examples of suitable saccharide moieties, including their corresponding pyranose form, include ribose, xylose, arabinose, glucose, galactose, mannose, telose, gulose, allose, altrose, idose, lyxose, ribulose, sorbose (sorbitan), fructose, and mixtures thereof. Examples of suitable disaccharides include maltose, lactose and sucrose. Disaccharides, oligosaccharides and polysaccharides can be a combination of two or more identical saccharides, for example maltose (two glucoses) or two or more different saccharides, for example sucrose (a combination of glucose and fructose). The degree of polymerization, u, is an average number from 1 to about 10, from 1 to about 8, from 1 to about 5, from 1 to about 3, and from 1 to about 2.

In various embodiments, the alkylpolysaccharide may be an alkylpolyglucoside (APG) surfactant of Formula (1) wherein: $R^{11}$ is a branched or straight chain alkyl group preferably having from 4 to 22 carbon atoms or from 8 to 18 carbon atoms, or a mixture of alkyl groups having an average value within the given range; sug is a glucose residue (e.g., a glucoside); and u is from 1 to about 5, and more preferably from 1 to about 3. In various embodiments, the surfactant component comprises an APG of Formula (1) wherein $R^{11}$ is a branched or straight chain alkyl group having from 8 to 10 carbon atoms or a mixture of alkyl groups having an average value within the given range and u is from 1 to about 3.

Non-limiting examples of commercially available alkylpolyglucosides include, for example, APG®, AGNIQUE®, or AGRIMUL® surfactants from BASF Inc., for example, Agnique PG 264, Agnique PG 8105 and Agnique 8107, and TRITON™ BG and TRITON™ CG, both available from Dow, Inc.

Additionally or alternatively, the surfactant may be an alkoxylated castor oil, for example an ethoxylated castor oil (e.g., having less than 30 EO units) or a proproxylated castor oil. Alkoxylated castor oil can be prepared by reaction of castor oil or hydrogenated castor oil with ethylene oxide, propylene oxide, ethylene glycol, or propylene glycol. Examples of a suitable alkoxylated castor oil include, but are not limited to Stepantex® CO-40 (40 EO), Toximul® 8242, Toximul® 8243, Toximul® 8244, all available from Stepan Chemical Company, and Cirrasol™ G-1292 (25 EO) available from Croda Inc. Other suitable examples may include Emulpon™ CO-550, CO-360, CO-200 from AkzoNobel Nouryon and Surfom R® 360 and R 540 from Oxiteno.

Additionally or alternatively, the surfactant may include various quaternary amine compounds. Quaternary amine compounds include various alkyl/aryl quaternary amine compounds and alkoxylated alkyl/aryl quaternary amine compounds including but not limited to ethoxylated quaternary ammonium compounds.

In some embodiments, the quaternary amine compound has a structure of formula (I):

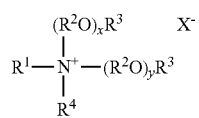

wherein $R^1$ is hydrocarbyl or substituted hydrocarbyl having from 1 to about 30 carbon atoms; each $R^2$ in each of the $(R^2O)_x$ and $(R^2O)_y$ groups is independently a linear or branched $C_2$-$C_4$ alkylene; each $R^3$ is independently hydrogen, or a linear or branched alkyl group having from 1 to about 4 carbon atoms; $R^4$ is hydrocarbyl or substituted hydrocarbyl having from 1 to about 30 carbon atoms; x and y are independently a number from 0 to about 10; and $X^-$ is an agriculturally acceptable anion.

Particular examples of quaternary amine compounds include tetrabutyl ammonium salts (e.g., tetrabutyl ammonium chloride and tetrabutyl ammonium chloride hydroxide) and trimethyl-tetradecyl ammonium salts (e.g., trimethyl-tetradecyl ammonium chloride). Other examples include the Tomamine series of quaternary amine compounds available from Evonik, particularly the Tomamine Q-series, which are represented by formula (II):

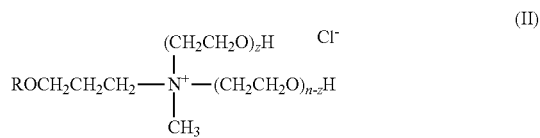

where R is alkyl (e.g., $C_1$-$C_{20}$ alkyl), n is the total number of moles of EO ($CH_2CH_2O$), and n+z is typically a number from 0 to 15. Specific examples of Tomamines include Q-14-2 (isodecyloxypropyl dihydroxyethyl methyl ammonium chloride), Q-17-2 (isotridecyloxypropyl dihydroxyethyl methyl ammonium chloride), Q-17-5 (isotridecyloxypropyl poly(5)oxyethylene methyl ammonium chloride), and Q-18-2 (octadecyl dihydroxyethyl methyl ammonium chloride).

E. Monocarboxylic Acid/Monocarboxylate Component

"Monocarboxylic acid" refers to a hydrocarbon or substituted hydrocarbon containing only one carboxy functional group (i.e., $R^1$—C(O)OH). "Monocarboxylate" refers to a salt (i.e., $R^1$ —C(O)OM wherein M is an agriculturally acceptable cation). In one embodiment, the composition comprises at least one monocarboxylate salt, which in aqueous compositions may be present, in whole or in part, in dissociated form as a monocarboxylate anion and the corresponding cation.

Representative monocarboxylic acids and monocarboxylates generally comprise a hydrocarbon or unsubstituted hydrocarbon selected from, for example, unsubstituted or substituted, straight or branched chain alkyl (e.g., $C_1$-$C_{20}$ alkyl such as methyl, ethyl, n-propyl, isopropyl, etc.); unsubstituted or substituted, straight or branched chain alkenyl (e.g., $C_2$-$C_{20}$ alkyl such as ethenyl, n-propenyl, isopropenyl, etc.); unsubstituted or substituted aryl (e.g., phenyl, hydroxyphenyl, etc.); or unsubstituted or substituted arylalkyl (e.g., benzyl). In one embodiment, the monocarboxylic acid is selected from the group consisting of formic acid, acetic acid, propionic acid, and benzoic acid. In another embodiment, the monocarboxylate salt is selected from the group consisting of formate salts, acetate salts, propionate salts, and benzoate salts.

In one embodiment, the herbicidal composition comprises a monocarboxylate salt having the formula $R^1$ —C(O)OM, wherein $R^1$ is unsubstituted or substituted $C_1$-$C_{10}$ alkyl and M is a non-amine, agriculturally acceptable cation. In another embodiment, the herbicidal composition comprises a monocarboxylate salt having the formula $R^1$ —C(O)OM, wherein $R^1$ is unsubstituted $C_1$-$C_6$ alkyl and M is an alkali metal salt. In another embodiment, the herbicidal composition comprises a monocarboxylate salt having the formula $R^1$—C(O)OM, wherein $R^1$ is unsubstituted $C_1$-$C_3$alkyl and M is an alkali metal salt selected from sodium and potassium. In another embodiment, the monocarboxylate salt is potassium acetate. In another embodiment, the monocarboxylate salt is sodium acetate.

F. Alkali Metal Phosphate

The herbicidal composition concentrates optionally may further include an alkali metal phosphate such as dipotassium phosphate. Dipotassium phosphate, for example, can provide additional buffering and/or water-conditioning for aqueous herbicidal compositions of the present invention. Dipotassium phosphate is particularly effective as a replacement for ammonium sulfate in herbicidal composition application mixtures prepared using hard water.

G. Non-Herbicide Additives

The herbicidal composition concentrates optionally may further include conventional additives, such as further surfactants, safeners, solubility enhancing agents, thickening agents, flow enhancers, foam-moderating agents, freeze protectants, UV protectants, preservatives, antimicrobials, and/or other additives that are necessary or desirable to improve the performance, crop safety, or handling of the composition.

In any embodiment, the herbicidal composition concentrate can include less than about 10 ppm of ammonium sulfate. In another embodiment, the herbicidal composition concentrate does not include ammonium sulfate.

In any embodiment, the herbicidal composition concentrate does not include an acid other than a monocarboxylic acid.

H. Further Herbicide Components

The herbicidal composition concentrates optionally may include at least one further herbicide. Representative examples of a further herbicide include, but are not limited to hydroxyphenylpyruvate dioxygenase (HPPD) inhibitors, acetyl-CoA carboxylase (ACCase) inhibitors, acetolactate synthase (ALS) inhibitors, acetohydroxy acid synthase (AHAS) inhibitors, photosystem II (PS II) inhibitors, photosystem I (PS I) inhibitors, protoporphyrinogen oxidase (PPO or Protox) inhibitors, carotenoid biosynthesis inhibitors, enolpyruvyl shikimate-3-phosphate (EPSP) synthase inhibitor, glutamine synthetase inhibitor, dihydropteroate synthetase inhibitor, mitosis inhibitors, nucleic acid inhibitors, cellulose inhibitors, oxidative phosphorylation uncouplers, dihydropteroate synthase inhibitors, fatty acid and lipid biosynthesis inhibitors, auxin transport inhibitors, salts and esters thereof, racemic mixtures and resolved isomers thereof, and mixtures thereof; salts and esters thereof; racemic mixtures and resolved isomers thereof; and combinations thereof.

Application mixtures can be prepared by diluting aqueous herbicidal concentrate compositions as described herein. Additional herbicides can be "tank mixed" with the application mixtures prepared from the aqueous herbicidal concentrate compositions described herein.

Examples of herbicides within these classes of further herbicides are provided below. Where an herbicide is referenced generically herein by name, unless otherwise restricted, that herbicide includes all commercially available forms known in the art such as salts, esters, free acids and free bases, as well as stereoisomers thereof.

Representative examples of HPPD inhibitors include, but are not limited to aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione, topramezone, tolpyralate, tefuryltrione, salts and esters thereof, and mixtures thereof.

Representative examples of ACCase inhibitors include, but are not limited to alloxydim, butroxydim, clethodim, cycloxydim, pinoxaden, sethoxydim, tepraloxydim and tralkoxydim, salts and esters thereof, and mixtures thereof. Another group of ACCase inhibitors include chlorazifop, clodinafop, clofop, cyhalofop, diclofop, diclofop-methyl, fenoxaprop, fenthiaprop, fluazifop, haloxyfop, isoxapyrifop, metamifop, propaquizafop, quizalofop and trifop, salts and esters thereof, and mixtures thereof. ACCase inhibitors also include mixtures of one or more "dims" and one or more "fops", salts and esters thereof.

Representative examples of ALS or AHAS inhibitors include, but are not limited to amidosulfuron, azimsulfruon, bensulfuron-methyl, bispyribac-sodium, chlorimuron-ethyl, chlorsulfuron, cinosulfuron, cloransulam-methyl, cyclosulfamuron, diclosulam, ethametsulfuron-methyl, ethoxysulfuron, flazasulfuron, florazulam, flucarbazone, flucetosulfuron, flumetsulam, flupyrsulfuron-methyl, foramsulfuron, halosulfuron-methyl, imazamethabenz, imazamox, imazapic, imazapyr, imazaquin, imazethapyr, imazosulfuron, iodosulfuron, metsulfuron-methyl, nicosulfuron, penoxsulam, primisulfuron-methyl, propoxycarbazone-sodium, prosulfuron, pyrazosulfuron-ethyl, pyribenzoxim, pyrithiobac, rimsulfuron, sulfometuron-methyl, sulfosulfuron, thiencarbazone, thifensulfuron-methyl, triasulfuron, tribenuron-methyl, trifloxysulfuron and triflusulfuron-methyl, salts and esters thereof, and mixtures thereof.

Representative examples of photosystem I inhibitors include, but are not limited to diquat and paraquat, salts and esters thereof, and mixtures thereof. Representative examples of photosystem II inhibitors include, but are not limited to ametryn, amicarbazone, atrazine, bentazon, bromacil, bromoxynil, chlorotoluron, cyanazine, desmedipham, desmetryn, dimefuron, diuron, fluometuron, hexazinone, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine and trietazine, salts and esters thereof, and mixtures thereof.

Representative examples of PPO inhibitors include, but are not limited to Diphenylethers (acifluorfen-sodium, bifenox, chlomethoxyfen, chlornitrofen, ethoxyfen-ethyl, fluoroglycofen-ethyl, fomesafen, lactofen, oxyfluorfen), N-phenylphthalimides (cinidon-ethyl, fumiclorac, flumiclorac-pentyl, flumioxazin), oxadiazoles (oxadiargyl, oxadiazon), oxazolidinediones (pentoxazone), phenylpyrazoles (fluazolate, pyraflufen-ethyl), pyrimidindiones (benzfendizone, butafenacil, saflufenacil, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate), thiadiazoles (fluthiacet-methyl, thidiazimin), triazinone (trifludimoxazin), triazolinones (azafenidin, carfentrazone-ethyl, sulfentrazone) and others (flufenpyr-ethyl, profluazol, pyraclonil).

Representative examples of carotenoid biosynthesis inhibitors include, but are not limited to aclonifen, amitrole, diflufenican, mesotrione, and sulcotrione.

A representative example of an EPSP inhibitor includes, but is not limited to N-phosphonomethyl glycine (glyphosate).

A representative example of a glutamine synthetase inhibitor includes, but is not limited to glufosinate.

A representative example of a dihydropteroate synthetase inhibitor includes, but is not limited to asulam.

Representative examples of mitosis inhibitors include, but are not limited to acetochlor, alachlor, dithiopyr, S-metolachlor, and thiazopyr.

Representative examples of nucleic acid inhibitors include, but are not limited to difenzoquat, fosamine, metham, and pelargonic acid.

In any embodiment, the herbicidal composition concentrate further includes a further herbicide selected from the group consisting of acetochlor, glyphosate, glufosinate, flumioxazin, fomesafen, and agriculturally acceptable salts thereof.

In one embodiment, the herbicidal composition concentrate further includes glyphosate, or an agriculturally acceptable salt thereof. Suitable glyphosate salts include, for example, the ammonium, diammonium, dimethylammonium, monoethanolamine, isopropylamine, and potassium salts, and combinations thereof. In any embodiment, the glyphosate salts are selected from the group consisting of monoethanolamine, isopropylamine, and potassium salts, and combinations thereof.

In any embodiment, the herbicidal composition concentrate further includes glufosinate, or an agriculturally acceptable salt thereof.

In any embodiment, the herbicidal composition concentrate includes dicamba, or an agriculturally acceptable salt or ester thereof, and glyphosate, or an agriculturally acceptable salt thereof. Additionally or alternatively, the herbicidal composition concentrate includes dicamba, or an agriculturally acceptable salt thereof; glyphosate, or an agriculturally acceptable salt thereof; and a non-amine, agriculturally acceptable acetate salt. Commercially available sources of glyphosate, and its agriculturally acceptable salts, include those products sold under the trade names DURANGO® DMA®, HONCHO PLUS®, ROUNDUP POWERMAX®, ROUNDUP WEATHERMAX®, TRAXION®, and TOUCHDOWN®.

Additionally or alternatively, the herbicidal composition concentrate includes 2,4-D, or an agriculturally acceptable salt or ester thereof, and glyphosate, or an agriculturally acceptable salt thereof. Additionally or alternatively, the herbicidal composition concentrate includes 2,4-D, or an agriculturally acceptable salt or ester thereof; glyphosate, or an agriculturally acceptable salt thereof; and a non-amine, agriculturally acceptable acetate salt.

In any embodiment, the herbicidal composition concentrate includes dicamba, or an agriculturally acceptable salt or ester thereof, and glufosinate, or an agriculturally acceptable salt thereof. Additionally or alternatively, the herbicidal composition concentrate includes 2,4-D, or an agriculturally acceptable salt or ester thereof, and glufosinate, or an agriculturally acceptable salt thereof.

In any embodiment, the herbicidal composition concentrate includes an agriculturally acceptable non-auxin herbicide salt (such as a glyphosate salt) that is an ionic liquid as described in published application US2013/0109572, i.e., a salt that is a liquid at a temperature at or below about 150° C.

I. Component Loading
  1. Herbicide Loading:

The herbicidal composition concentrate described herein can be diluted with water prior to application. Concentrated herbicidal compositions as described herein typically can include on an acid equivalent basis (a.e. or ae), for example, from about 120 to about 600 g a.e./L, from about 300 to about 600 g a.e./L, from about 350 to about 600 g a.e./L, from about 400 to about 600 g a.e./L, from about 450 to about 600 g a.e./L, or from about 500 to about 600 g a.e./L total herbicide loading. As used herein, the term "total herbicide loading" encompasses a herbicide loading when only one herbicide is present in the composition, for example, one auxin herbicide or one non-auxin herbicide, as well as the total when one or more herbicides are present, for example, two auxin herbicides or an auxin herbicide and a non-auxin herbicide. Additional examples of representative total herbicide loading include about 120, 150, 200, 250, 300, 350, 400, 450, 500, 550, and 600 g a.e./L, and ranges thereof (i.e., from about 120 to about 150 g a.e./L, from about 150 to about 200 g a.e./L, from about 200 to about 250 g a.e./L, from about 250 to about 300 g a.e./L, from about 300 to about 350 g a.e./L, from about 350 to about 400 g a.e./L from about 400 to about 450 g a.e./L, from about 450 to about 500 g a.e./L, from about 500 to about 550 g a.e./L, from about 550 to about 600 g a.e./L total herbicide loading).

In any embodiment, the herbicidal composition can be a liquid concentrate containing, for example, a total amount (acid equivalent weight) of herbicide, by weight of the composition concentrate, of greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, or about 70%. Additionally or alternatively, the herbicidal composition is a liquid concentrate containing, for example, a total amount (acid equivalent weight) of herbicide, by weight of the composition concentrate, from about 5% to about 70%, about 5% to about 60%, about 5% to about 50%, about 10% to about 40%, about 10% to about 30%, or about or about 10% to about 20%.

In herbicidal compositions concentrates including an auxin herbicide and a non-auxin herbicide, the weight ratio on an acid equivalent basis of the auxin herbicide to the non-auxin herbicide is typically no greater than about 50:1, for example, about 50:1, 25:1, 10:1, 5:1, 3:1, 2:1, 1:1, 1:2, 1:3, 1:5, about 1:10, or ranges thereof such as from about 50:1 to about 1:10, from about 50:1 to about 1:5, from about 50:1 to about 1:1, from about 50:1 to about 3:1, from about 50:1 to about 5:1, from about 50:1 to about 10:1, from about 25:1 to about 1:1, or from about 25:1 to about 3:1.

In a particular embodiment, the herbicidal composition concentrate can include an auxin herbicide in an amount (acid equivalent weight), by weight of the composition concentrate, of about 5% to about 70%, about 5% to about 60%, about 5% to about 50%, about 10% to about 40%, about 10% to about 30%, or about or about 10% to about 20%, and non-auxin herbicide in an amount (acid equivalent weight), by weight of the composition concentrate, of about 10% to about 70%, about 15% to about 60%, about 15% to about 50%, or about 20% to about 40%.

For any given auxin herbicide, one skilled in the art can readily determine using routine experimentation a minimum concentration of auxin herbicide and a minimum ratio of auxin herbicide to any additional auxin herbicides and/or non-auxin herbicides contained in the herbicidal composition that is desirable for the intended application.

2. Oil Loading:

In any embodiment, the oil or ester thereof as described herein may be present in the composition concentrate, by weight of the composition concentrate, in a total oil loading of greater than or equal to about 1%, greater than or equal to about 1.5%, greater than or equal to about 2%, greater than or equal to about 5%, greater than or equal to about 8%, greater than or equal to about 10%, greater than or equal to about 12%, greater than or equal to about 15%, or about 20%. As used herein, the term "total oil loading" encompasses an oil loading when only one oil or ester thereof is present in the composition as well as the total when one or more oils and/or esters thereof are present. Additionally or alternatively, the oil or ester thereof may be present in the composition concentrate, by weight of the composition concentrate, in a total oil loading of about 1% to about 20%, about 1% to about 15%, about 2% to about 12%, about 2% to about 10%, or about or about 5% to about 10%.

Advantageously, the total oil loading in the composition concentrates described herein can provide at least 10 ml of oil sprayed per acre (0.404686 ha), preferably at least 30 ml of oil sprayed per acre (0.404686 ha) when the composition concentrates is sprayed at its agronomic rate, for example, 560 g acid equivalent per hectare (ha) for dicamba.

3. Polymeric Emulsifying Agent Loading

In any embodiment, the polymeric emulsifying agent as described herein may be present in the composition concentrate, by weight of the composition concentrate, in a total polymeric emulsifying agent loading of greater than or equal to about 0.2 wt. %, greater than or equal to about 0.5 wt. %, greater than or equal to about 0.7 wt. %, greater than or equal to about 1 wt. %, greater than or equal to about 2 wt. %, greater than or equal to about 3 wt. %, greater than or equal to about 4 wt. %, greater than or equal to about 5 wt. %, greater than or equal to about 6 wt. %, greater than or equal to about 7 wt. %, greater than or equal to about 8 wt. %, greater than or equal to about 9 wt. %, greater than or equal to about 10 wt. %, or about 15 wt. %. As used herein, the term "total polymeric emulsifying agent loading" encompasses a polymeric emulsifying agent loading when only one polymeric emulsifying agent is present in the composition as well as the total when one or more polymeric emulsifying agents are present. Additionally or alternatively, the polymeric emulsifying agent may be present in the composition concentrate, by weight of the composition concentrate, in a total emulsifying agent loading of about 0.2 wt. % to about 15% wt. %, about 0.2 wt. % to about 15% wt. %, about 0.2 wt. % to about 10 wt. %, about 0.5 wt. % to about 10 wt. %, or about 1 wt. % to about 5 wt.

Additionally or alternatively, the polymeric emulsifying agent and the oil or ester thereof as described herein may be present in the composition concentrate, by weight of the composition concentrate, in a total polymeric emulsifying agent and oil loading of greater than or equal to about 0.5 wt. %, greater than or equal to about 0.7 wt. %, greater than or equal to about 1 wt. %, greater than or equal to about 2 wt. %, greater than or equal to about 3 wt. %, greater than or equal to about 4 wt. %, greater than or equal to about 5 wt. %, greater than or equal to about 6 wt. %, greater than or equal to about 7 wt. %, greater than or equal to about 8 wt. %, greater than or equal to about 9 wt. %, or greater than or equal to about 10 wt. %. As used herein, the term "total polymeric emulsifying agent and oil loading" encompasses a polymeric emulsifying agent loading when only one polymeric emulsifying agent and oil and/or ester thereof is present in the composition as well as the total when one or more polymeric emulsifying agents and one or more oils and/or esters thereof are present. Additionally or alternatively, the polymeric emulsifying agent and the oil or ester thereof may be present in the composition concentrate, by weight of the composition concentrate, in a total emulsifying agent and oil loading of about 0.5 wt. % to about 10% wt. %, about 0.5 wt. % to about 8% wt. %, or about 1 wt. % to about 7 wt.

4. Surfactant Loading:

In any embodiment, the surfactant as described herein may be present in the composition concentrate, by weight of the composition concentrate, in a total surfactant loading of greater than or equal to about 1 wt. %, greater than or equal to about 2 wt. %, greater than or equal to about 3 wt. %, greater than or equal to about 4 wt. %, greater than or equal to about 5 wt. %, greater than or equal to about 6 wt. %, greater than or equal to about 7 wt. %, greater than or equal to about 8 wt. %, greater than or equal to about 9 wt. %, greater than or equal to about 10 wt. %, greater than or equal to about 12 wt. %, greater than or equal to about 15 wt. %, greater than or equal to about 20 wt. %, greater than or equal to about 25 wt. %, greater than or equal to about 25 wt. %, or about 30 wt. %. As used herein, the term "total surfactant loading" encompasses a surfactant loading when only surfactant is present in the composition as well as the total when one or more surfactants are present. Additionally or alternatively, the surfactant may be present in the composition concentrate, by weight of the composition concentrate, in a surfactant loading of about 1 wt. % to about 30% wt. %, about 1 wt. % to about 25% wt. %, about 2 wt. % to about 25 wt. %, about 3 wt. % to about 25 wt. %, about 4 wt. % to about 25 wt. %, about 5 wt. % to about 25 wt. %, about 5 wt. % to about 20 wt. %, about 10 wt. % to about 20 wt. %, about 15 wt. % to about 20 wt. %, or about 10 wt. % to about 15 wt. %.

5. Monocarboxylic Acid/Monocarboxylate Loading:

In any embodiment, the herbicidal composition concentrate may include a single monocarboxylic acid, or monocarboxylate thereof, or a mixture of two or more monocarboxylic acids, or monocarboxylates thereof.

In various embodiments, the concentration of volatilized auxin herbicide in the vapor phase surrounding a herbicidal composition comprising an auxin herbicide and a monocarboxylic acid, or monocarboxylate thereof, is less than about 90%, 80%, 70%, 60%, 50%, 40%, 30%, 20%, 10%, or 5% of the concentration of volatilized auxin herbicide in the vapor phase surrounding the reference composition lacking the monocarboxylate.

The monocarboxylic acid or monocarboxylate loading of the herbicidal composition generally can depend upon the auxin herbicide loading of the herbicidal composition, the salt form of the auxin herbicide, and the properties of any other components of the herbicidal composition, and will be an amount sufficient to reduce the volatility of the auxin herbicide relative to a reference composition lacking the monocarboxylic acid or monocarboxylate, but otherwise having the same composition. For example, the monoethanolamine and diglycolamine salts of dicamba are less volatile than the dimethylamine and isopropylamine salts of dicamba and the loading required for the less volatile salts may be less than the loading required for the more volatile salts. In addition, the loading of the monocarboxylic acid, or monocarboxylate thereof, can vary with the specific combination of auxin herbicide, optional non-auxin herbicide, and monocarboxylic acid, or monocarboxylate thereof.

In the herbicidal composition concentrates described herein, the molar ratio of the auxin herbicide to the monocarboxylic acid, or monocarboxylate thereof, is typically no less than about 1:10 and no greater than about 10:1. Representative molar ratios of auxin herbicide acid equivalent (a.e.) to total monocarboxylic acid, or monocarboxylate thereof, are, for example, from 1:10 to about 10:1, from about 3:10 to about 10:1, from about 1:5 to about 5:1, and from about 3:1 to about 1:3. In any embodiment, the molar ratio of auxin herbicide to monocarboxylic acid, or monocarboxylate thereof, is about 2:1 to about 1:2. In any embodiment, the molar ratio of auxin herbicide to monocarboxylic acid, or monocarboxylate thereof, is about 1:1.

In any embodiment, the herbicidal composition concentrates can contain an amount (acid equivalent weight) of the monocarboxylic acid, or monocarboxylate thereof, by weight of the concentrate, from about 0.25% to about 35%, about 5% to about 30%, or about 5% to about 20%.

6. Alkali Metal Phosphate/Alkali Metal Carbonate Loading

When the herbicidal composition concentrate includes an alkali metal phosphate, such as dipotassium phosphate, the molar ratio of the alkali metal phosphate to the monocarboxylic acid, or monocarboxylate thereof, can range, for example, from about 1:5 to about 5:1, from about 3:1 to about 1:3, or from about 2:1 to about 1:2. In any embodiment, the molar ratio of alkali metal phosphate to monocarboxylic acid, or monocarboxylate thereof, is about 1:1.

When the herbicidal composition concentrate includes an alkali metal carbonate, such as potassium carbonate, the molar ratio of the alkali metal carbonate to the monocarboxylic acid, or monocarboxylate thereof, can range, for example, from about 1:5 to about 5:1, from about 3:1 to about 1:3, or from about 2:1 to about 1:2. In any embodiment, the molar ratio of alkali metal carbonate to monocarboxylic acid, or monocarboxylate thereof, is about 1:1.

J. Methods of Making an Herbicidal Composition Concentrate

Methods of making an herbicidal composition concentrate as described herein are also provided. The herbicidal composition concentrate formed can be an emulsion or a micro-emulsion. The method may include admixing at least one herbicide as described herein, for example an auxin herbicide, with an oil or an ester of the oil as described herein and a polymeric emulsifying agent as described herein to form the herbicidal composition concentrate. In any embodiment, the oil or the ester of the oil can be admixed with the polymeric emulsifying agent to form a first mixture, and the at least one herbicide can be admixed with the first mixture to form the herbicidal composition concentrate. The oil or an ester of the oil can be a vegetable oil, an ester of the vegetable oil, or a petroleum-based oil, all as described herein. For example, the oil or the ester of the oil can be selected from the group consisting soybean oil, an ester of soybean oil, canola oil, an ester of canola oil, palm oil, an ester of palm oil, rapeseed oil, an ester of rapeseed oil, sunflower seed oil, an ester of sunflower seed oil, corn oil, an ester of corn oil, peanut oil, an ester of peanut oil, sesame oil, an ester of sesame oil, olive oil, an ester of olive oil, and a combination thereof.

The polymeric emulsifying agent can be selected from the group consisting of glycerol ethoxylate-polyricinoleate (e.g., corresponding to Formula (A) as described herein), glycerol ethoxylate-poly-(12-hydroxystearate) (e.g., corresponding to Formula (B) as described herein), polyethylene glycol (PEG)-polyricinoleate (e.g., corresponding to Formula (C) as described herein), PEG-poly-(12-hydroxystearate) (e.g., corresponding to Formula (D) as described herein), and a combination thereof. The at least one auxin herbicide can be selected from the group consisting of dicamba, an agriculturally acceptable salt of dicamba (e.g., N,N-[aminopropyl]methylamine, monoethanolamine, dimethylamine, isopropylamine, diglycolamine, a potassium salt, and a sodium salt, and a combination thereof), an agriculturally acceptable ester of dicamba, 2,4-D, an agriculturally acceptable salt of 2,4-D, an agriculturally acceptable ester of 2,4-D, and a combination thereof.

The total herbicide loading of the composition concentrate can be as described herein, for example, an amount (acid equivalent weight) of at least about 5% to about 50% by weight of the composition concentrate. The total oil loading of the composition concentrate can be as described herein, for example, an amount of at least about 1.5% by weight of the composition concentrate. The total polymeric emulsifying agent loading of the composition concentrate can be as described herein, for example, an amount of at least about 0.2% by weight of the composition concentrate.

In any embodiment, the method may further include admixing the at least one herbicide with water to form an aqueous solution prior to admixing with the oil or the ester of the oil and the polymeric emulsifying agent. Additionally or alternatively, the method may further include admixing at least one surfactant as described herein (e.g., a phosphate ester, an alkylpolysaccharide, an alkoxylated castor oil, or a combination thereof) with the at least one herbicide, the oil or the ester of the oil, and the polymeric emulsifying agent.

Additionally or alternatively, the method may further include admixing at least one monocarboxylic acid (e.g., acetic acid) or a monocarboxylate thereof (e.g., potassium acetate) with the at least one herbicide, the oil or the ester of the oil, and the polymeric emulsifying agent. In any embodiment, the herbicidal composition concentrate can contain an amount (acid equivalent weight) of the monocarboxylic acid, or monocarboxylate thereof, by weight of the concentrate, as described herein, for example, about 5% to about 30% and/or a molar ratio of the at least one monocarboxylic acid or the monocarboxylate thereof to the auxin herbicide as described herein, for example, from about 1:10 to about 10:1.

Additionally or alternatively, the method may further comprise mixing at least one further herbicide (e.g., glyphosate, an agriculturally acceptable salt of glyphosate, glufosinate, an agriculturally acceptable salt of glufosinate, and a combination thereof) with the at least one auxin herbicide, with the oil or the ester of the oil and the polymeric emulsifying agent. Optionally, an antifoam agent may be added to suppress formation of foam while mixing. A suitable antifoam agent includes, but is not limited to a silicone antifoam agent, for example, SAG 1572 available from Momentive. The further herbicide can be present in the herbicidal composition concentrate in an amount (acid equivalent weight) as described herein, for example, about 15% to about 60% by weight of the composition.

Having described the invention in detail, it will be apparent that modifications and variations are possible without departing from the scope of the invention defined in the appended claims.

EXAMPLES

The following non-limiting examples are provided to further illustrate the present invention. It should be noted that the composition examples below are presented on the basis of the components initially combined to form the reported tank mix or concentrate. The various embodiments of the present invention are intended to encompass such initial compositions as well as any corresponding compositions resulting from interaction among the components once combined, such as where a monocarboxylic acid salt is formed in situ by combining a monocarboxylic acid with a neutralizing base.

Example 1—Preparation of Glycerol Ethoxylate-4-Ricinoleate 100 g (about 0.1 mol) of glycerol ethoxylate (Mn 1000) (Product 441864, obtained from Millipore Sigma) was placed in a 3-neck, vacuum-dried 500-ml flask equipped with a stir bar and preheated in an 80° C. oven under flowing nitrogen. The flask was transferred to a 110° C. oil bath and a septum pierced by a needle, a pressure-equalizing funnel, and a right-angle hose connection adapter, open to the atmosphere (serving as the exit for nitrogen purge gas) were connected to the necks of the flask. Gentle nitrogen flow was initiated through the needle and stirring was maintained for 10 minutes. 2 g of 25% sodium methoxide in methanol was added and dropwise addition of 125 g of methyl ricinoleate (4 equivalents) (Product R0029, obtained from TCI Chemicals) was initiated. After the addition was complete (1 hour), stirring was continued for an additional 30 minutes before adding 1 g of acetic acid and collecting the product. The product was a light yellow, translucent liquid with low viscosity.

Figure 1B:
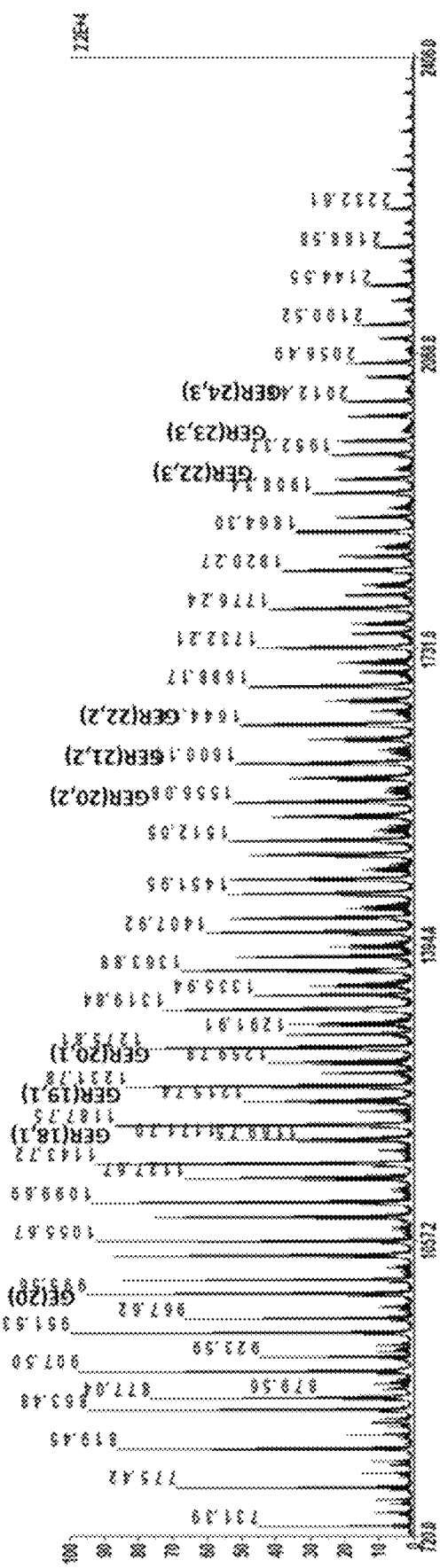

The glycerol ethoxylate-4-ricinoleate product was characterized by mass spectrometry with matrix-assisted laser desorption ionization (MALDI-MS). Ten microliters each of the glycerol ethoxylate-4-ricinoleate product from Example 1 and a matrix solution were combined in a microcentrifuge tube and 1 microliter was spotted into a well of the MALDI-MS sample plate. The matrix solution consisted of 10 g/L α-cyano-4-hydroxycinnamic acid (CHCA), 10 mM NaCl, and 0.1% trifluoroacetic acid in 50% acetonitrile. The samples, along with standard peptides for mass calibration, were analyzed on an AB SCIEX TOF/TOF 5800 MALDI-MS/MS mass spectrometer. The resultant mass spectrum is shown in FIGS. 1A and 1B. The spectrum of the glycerol ethoxylate starting material with a NaCl matrix consisted of a series of peaks separated by 44 mass units—the mass of an ethylene oxide monomer. The largest peak, corresponding to the sodium adduct of glycerol with 20 EO units, was observed at a mass of 995.5 Daltons. As expected, masses were larger with the glycerol ethoxylate-4-ricinoleate, again with most peaks separated by 44 mass units. The largest peaks observed corresponded to glycerol ethoxylate with 18, 19, and 20 EO's functionalized with one ricinoleate unit, but clusters with two ricinoleate units (20, 21, and 22 EO's) and three ricinoleates (22, 23, and 24 EO's) were also prominent.

Example 2— Preparation of Glycerol Ethoxylate-7-Ricinoleate

The procedure of Example 1 was repeated for the addition of the first four ricinoleate units. A further three equivalents (94 g) were then added over 30 minutes followed by another 30 minutes of stirring. The product was a low-viscosity liquid similar to the 4-ricinoleate condensate.

Example 3— Condensation of PEG 6000 with Six Equivalents of Methyl Ricinoleate 180 g of PEG, 6000 mol wt. (0.03 mol) (commercially available from Millipore Sigma) was added to a 500 ml 3-neck, vacuum-dried roundbottom flask equipped with a stir bar and placed in a 90° C. oven to melt the PEG. The flask was transferred to a 110° C. oil bath and a septum pierced by a needle, a pressure-equalizing funnel, and a right-angle hose connection adapter, open to the atmosphere (serving as the exit for nitrogen purge gas) were connected to the necks of the flask. Gentle nitrogen flow was initiated through the needle and stirring was maintained for 10 minutes while the PEG came to temperature. 2 g of 25% sodium methoxide in methanol (obtained from Millipore Sigma) was added at that point.

56 g of methyl ricinoleate (6 equivalents) (Product R0029, obtained from TCI Chemicals) was added dropwise over 30 minutes and stirring continued for a further 70 minutes. The product was a clear liquid with some suspended white waxy lumps. The product solidified to a white wax after standing at room temperature overnight.

Example 4— Condensation of PEG 8000 with Six Equivalents of Methyl Ricinoleate

The same procedure as Example 3 was followed except the oil bath temperature was increased to 150° C. due to the higher melting point of PEG 8000 (commercially available from Millipore Sigma). 160 g of PEG 8000 (0.02 mol) was held overnight in the roundbottom flask under nitrogen in a 100° C. oven to melt the PEG. The flask was then transferred to the oil bath. The procedure in Example 3 was followed, with methyl ricinoleate reduced to 37.5 g (six equivalents) added over 70 minutes and 25% sodium methoxide reduced to 1 g due to the increase in PEG molecular weight. Prior to collecting the product, 1 g of acetic acid was added to quench the methoxide catalyst. The product was a clear liquid, which solidified to a hard, white solid upon cooling.

Example 5—MEA Dicamba Formulations with Soybean Oil, PEG-Ricinoleate Emulsifying Agents, and High Levels of Potassium Acetate ("Vaporgrip™")

PEG-6000-6-ricinoleate obtained in Example 3 was dissolved in soybean oil and a stock solution of the monoethanolamine (MEA) salt of dicamba with an acid equivalent dicamba concentration of 55% was prepared. The formulation was 26% dicamba on an acid-equivalent basis, which contained 1.89 moles of potassium acetate per mole of dicamba for control of volatility.

Formulations were prepared with the following composition as shown in Table 1 by combining the components and stirring for about 10 minutes, followed by agitation with an Ika-Turrax T25 high-shear rotor-stator mixer operated at a minimum of 15,000 rpm.

TABLE 1

| | |
|---|---|
| MEA dicamba, 55% ae solution | 47.3% |
| Acetic acid | 14.1% |
| Potassium hydroxide, 45% wt/wt | 27.8% |
| Crodafos O3A | 0.5% |
| PEG-6000-6-ricinoleate in soy oil | 5.5% |
| Toximul 8243 | 1.0% |
| Deionized water | 3.8% |

Variants of the formulation were prepared with 1%, 2%, and 4% PEG-6000-6-ricinoleate in soy oil as well as a comparison formulation with soy oil alone. These formulations were used for the spray particle size study in Example 6.

Example 6—Spray Particle Size of Tank Mixtures with Roundup Powermax

Tank mixtures 1, 2, 3, shown in Table 2, were prepared from the dicamba Formulations of Example 5 and Roundup Powermax in tap water to provide spray rates of 560/1260 g acid equivalent per hectare dicamba/glyphosate assuming a spray rate of 15 gallons (56.7812 liter) per acre (0.404686 ha). A tank mixture of Roundup Xtendimax (a diglycolamine dicamba formulation without a built-in drift retardant) with Powermax was run as a control (Control Tank Mix).

The mixtures were sprayed with two nozzles, the Wilger UR11004 at 50 psi and the Wilger DR11005 at 40 psi in a spray particle size measurement system which recirculated the tank mixture. Spray particle size was measured with a Malvern Spraytec laser diffraction spray particle size instrument. The volume percent of the spray consisting of "driftable fines" defined as droplets with diameters below 150 μm is a widely accepted measure of the tendency of an agricultural spray to drift.

Table 2 below shows percent fines for these spray mixtures. Inclusion of soy oil in the formulations greatly reduces drift and increasing levels of PEG-6000-6-ricinoleate improve the performance of the soy oil drift retardant with both nozzles.

TABLE 2

Volume % less than 150 μm for 26% ae dicamba formulations with soy oil containing PEG-6000-6-ricinoleate sprayed at 560 g/ha ae, 15 gallons per acre tank mixed with Roundup Powermax I
(Tank Mixes 1-3)

| | Polymeric Emulsifying Agent % in soy oil | DR11005 40 psi | UR11004 50 psi |
|---|---|---|---|
| Tank Mix 1 | 1% | 1.87 ± .15 | 1.55 ± .01 |
| Tank Mix 2 | 2% | 1.73 ± .04 | 1.47 ± .03 |
| Tank Mix 3 | 4% | 1.68 ± .05 | 1.42 ± .02 |
| Tank Mix 4 (soy oil only) | — | 1.78 ± .03 | 1.55 ± .03 |
| Control Tank Mix-Xtendimax (Roundup Xtendimax + PowerMax) | — | 3.92 ± .10 | 2.95 ± .03 |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A herbicidal composition concentrate comprising:
   (a) at least one herbicide present in an amount (acid equivalent weight) of from about 5% by weight to about 70% by weight of the composition concentrate, wherein the at least one herbicide comprises an auxin herbicide;
   (b) an oil or an ester of the oil in an amount of from about 1% by weight to about 20% by weight of the composition concentrate, wherein the oil or the ester of the oil is a vegetable oil, an ester of the vegetable oil, or a petroleum-based oil; and
   (c) a polymeric emulsifying agent selected from the group consisting of glycerol ethoxylate- polyricinoleate, glycerol ethoxylate-poly-(12-hydroxystearate), polyethylene glycol (PEG)- polyricinoleate, and a combination thereof, in an amount of from about 0.2% by weight to about 15% by weight of the composition concentrate, and wherein:

the glycerol ethoxylate-poly-(12-hydroxystearate) corresponds in structure to Formula B:

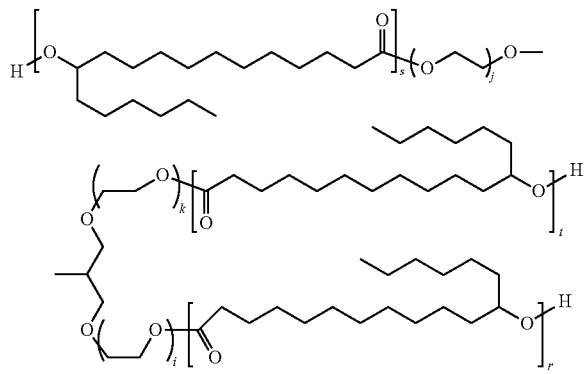

wherein i+j+k=10 to 50 and r+s+t=3 to 12.

2. The herbicidal composition concentrate of claim 1, wherein the at least one herbicide is present in an amount (acid equivalent weight) of about 5% to about 50% by weight of the composition concentrate.

3. The herbicidal composition concentrate of claim 1, wherein the auxin herbicide is selected from the group consisting of dicamba, an agriculturally acceptable salt of dicamba, an agriculturally acceptable ester of dicamba, 2,4-D, an agriculturally acceptable salt of 2,4-D, an agriculturally acceptable ester of 2,4-D, and a combination thereof.

4. The herbicidal composition concentrate of claim 1, wherein the auxin herbicide is an agriculturally acceptable salt of dicamba, wherein the salt is selected from group consisting of N,N-[aminopropyl] methylamine, monoethanolamine, dimethylamine, isopropylamine, diglycolamine, a potassium salt, a sodium salt, and a combination thereof.

5. The herbicidal composition concentrate of claim 1, wherein the oil or the ester of the oil is present in an amount of from about 1% by weight to about 15% by weight of the composition concentrate.

6. The herbicidal composition concentrate of claim 1, wherein the oil or the ester of the oil is selected from the group consisting soybean oil, an ester of soybean oil, canola oil, an ester of canola oil, palm oil, an ester of palm oil, rapeseed oil, an ester of rapeseed oil, sunflower seed oil, an ester of sunflower seed oil, corn oil, an ester of corn oil, peanut oil, an ester of peanut oil, sesame oil, an ester of sesame oil, olive oil, an ester of olive oil, and a combination thereof.

7. The herbicidal composition concentrate of claim 1, wherein the polymeric emulsifying agent is present in an amount of from about 0.2% to about 10% by weight of the composition concentrate.

8. The herbicidal composition concentrate of claim 1, wherein the glycerol ethoxylate-polyricinoleate corresponds in structure to Formula A:

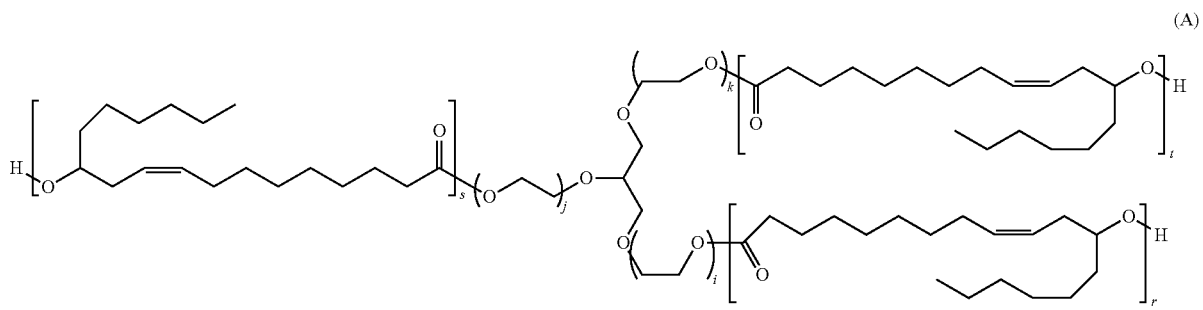

(A)

wherein i+j+k=10 to 50 and r+s+t=3 to 12.

9. The herbicidal composition concentrate of claim 1, wherein the glycerol ethoxylate-poly-(12-hydroxystearate) corresponds in structure to Formula B:

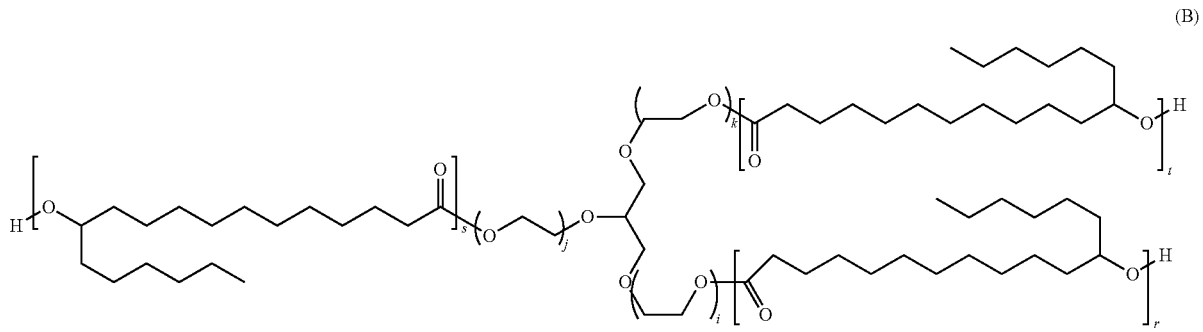

(B)

wherein i+j+k=20 to 35 and r+s+t=4 to 8.

10. The herbicidal composition concentrate of claim 1, wherein the polyethylene glycol (PEG)-polyricinoleate corresponds in structure to Formula C:

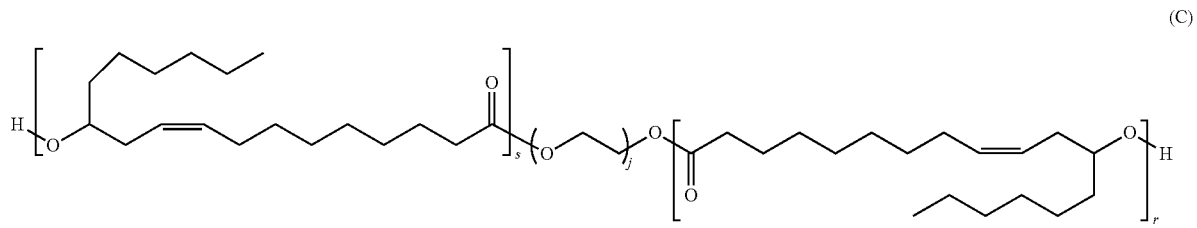

(C)

wherein j=50 to 250 and s+r=2 to 10.

11. The herbicidal composition concentrate of claim 1, further comprising a surfactant selected from the group consisting of a phosphate ester, an alkylpolysaccharide, an alkoxylated castor oil, and a combination thereof.

12. The herbicidal composition concentrate of claim 1, further comprising at least one monocarboxylic acid or a monocarboxylate thereof.

13. The herbicidal composition concentrate of claim 12, wherein the at least one monocarboxylic acid or the monocarboxylate thereof is present in an amount (acid equivalent weight) of about 5% to about 30% by weight of the composition concentrate.

14. The herbicidal composition concentrate of claim 12, wherein the molar ratio of the at least one monocarboxylic acid or the monocarboxylate thereof to the auxin herbicide is from about 10:1 to about 10:3.

15. The herbicidal composition concentrate of claim 12, wherein the monocarboxylic acid is acetic acid or the monocarboxylate is potassium acetate.

16. The herbicidal composition concentrate of claim 1, wherein the at least one herbicide further comprises an herbicide selected from the group consisting of glyphosate, an agriculturally acceptable salt of glyphosate, glufosinate, an agriculturally acceptable salt of glufosinate, and a combination thereof.

17. The herbicidal composition concentrate of claim 1, wherein the composition concentrate is an emulsion or a micro-emulsion.

18. The herbicidal composition concentrate of claim 1, wherein the polymeric emulsifying agent was prepared using a basic catalyst.

* * * * *